US012492584B2

(12) United States Patent
Witchey

(10) Patent No.: US 12,492,584 B2
(45) Date of Patent: Dec. 9, 2025

(54) EXTENDABLE DOOR LOCK

(71) Applicant: Bryan Witchey, Jupiter, FL (US)

(72) Inventor: Bryan Witchey, Jupiter, FL (US)

( * ) Notice: Subject to any disclaimer, the term of this patent is extended or adjusted under 35 U.S.C. 154(b) by 76 days.

(21) Appl. No.: 18/198,239

(22) Filed: May 16, 2023

(65) Prior Publication Data

US 2023/0417093 A1 Dec. 28, 2023

Related U.S. Application Data

(60) Provisional application No. 63/355,896, filed on Jun. 27, 2022.

(51) Int. Cl.
*E05C 19/00* (2006.01)
*E05B 37/00* (2006.01)

(52) U.S. Cl.
CPC ............ *E05C 19/003* (2013.01); *E05B 37/00* (2013.01)

(58) Field of Classification Search
CPC ...... E05C 19/003; E05C 19/18; E05C 19/184; E05C 19/186; E05C 19/188; E05C 17/30
See application file for complete search history.

(56) References Cited

U.S. PATENT DOCUMENTS 4,188,032 A 2/1980 Yanagiok
4,234,190 A 11/1980 Airhart
4,255,087 A 3/1981 Wackerle et al.
4,339,490 A 7/1982 Yoshioka et al.
4,671,842 A 6/1987 Prochaska et al.
4,696,459 A 9/1987 Woltron et al.
4,779,910 A * 10/1988 Dameron .............. E05C 19/003 292/259 R
5,259,821 A * 11/1993 Bryant ...................... F16H 7/14 52/118
5,534,318 A 7/1996 Andre De La Porte et al.
5,601,493 A 2/1997 Nakazono et al.
5,665,470 A 9/1997 Key et al.
6,173,590 B1 1/2001 Witchey
6,519,983 B2 2/2003 Witchey
6,539,757 B2 4/2003 Witchey
(Continued)

FOREIGN PATENT DOCUMENTS

DE 202009008847 U1 * 2/2010 ........... E05C 19/003
WO WO-2006098737 A1 * 9/2006 ........... E05C 19/003

OTHER PUBLICATIONS

Machine translation for DE 202009008847U1 (Year: 2009).*

*Primary Examiner* — Christine M Mills
*Assistant Examiner* — Christopher F Callahan

(57) ABSTRACT

An extendable door lock to be applied across the exterior of a door that opens outwards to help prevent illicit passage through the door thereby helping to prevent theft or damage to contents in a room or facility located behind the door. In addition, the extendable door lock can be applied to the interior of a door that happens to open inwards; such use can stop someone illicitly entering an office or other space where, for example, there is someone working late and alone who desires a lock to prevent someone entering the office. In one non-limiting embodiment, an extendable door lock is provided comprising: a first shaft, a second shaft, a first mounting bracket, a second mounting bracket, and a lock mechanism. In one non-limiting embodiment an extendable door lock sub-assembly is provided comprising: a first shaft, a second shaft, and a lock mechanism.

20 Claims, 30 Drawing Sheets

(56) References Cited

U.S. PATENT DOCUMENTS

| | | | | |
|---|---|---|---|---|
| 6,553,797 | B2 | 4/2003 | Witchey | |
| 6,698,256 | B2 | 3/2004 | Witchey | |
| 6,705,135 | B2 | 3/2004 | Witchey | |
| 6,797,331 | B2 | 9/2004 | Singler et al. | |
| 6,990,838 | B2 | 1/2006 | Witchey | |
| 7,007,522 | B1 * | 3/2006 | Lee | E05C 19/186 70/423 |
| 7,083,199 | B2 | 8/2006 | Graber et al. | |
| 7,278,663 | B2 | 10/2007 | Witchey | |
| 7,337,636 | B2 | 3/2008 | Witchey | |
| 7,815,211 | B2 | 10/2010 | Witchey | |
| 8,376,426 | B2 | 2/2013 | Choi et al. | |
| 8,864,195 | B2 * | 10/2014 | Sullivan | E05B 65/0888 292/DIG. 60 |
| 9,168,801 | B2 | 10/2015 | Dicke et al. | |
| 9,574,081 | B2 | 2/2017 | Ishimoto et al. | |
| 9,751,239 | B2 | 9/2017 | Murai et al. | |
| 10,227,464 | B2 | 3/2019 | Saji | |
| 10,240,371 | B2 | 3/2019 | Witchey | |
| 10,272,873 | B2 | 4/2019 | Witchey | |
| 10,611,057 | B2 | 4/2020 | Taketa et al. | |
| 10,773,472 | B2 | 9/2020 | Takano et al. | |
| 11,192,280 | B2 | 12/2021 | Ochi et al. | |
| 11,198,651 | B2 | 12/2021 | Sadler et al. | |
| 11,198,924 | B2 | 12/2021 | Chandrasekaran et al. | |
| 11,203,178 | B2 | 12/2021 | Kuroda | |
| 11,208,535 | B2 | 12/2021 | Ochi et al. | |
| 11,208,911 | B2 | 12/2021 | Sadler et al. | |
| 11,220,465 | B2 | 1/2022 | Kubo et al. | |
| 2002/0104336 | A1 | 8/2002 | Witchey | |
| 2002/0104340 | A1 | 8/2002 | Witchey | |
| 2002/0104342 | A1 | 8/2002 | Witchey | |
| 2003/0167805 | A1 | 9/2003 | Witchey | |
| 2003/0167806 | A1 | 9/2003 | Witchey | |
| 2003/0167807 | A1 | 9/2003 | Witchey | |
| 2004/0200246 | A1 | 10/2004 | Witchey | |
| 2005/0099018 | A1 * | 5/2005 | Witchey | E05B 67/38 292/218 |
| 2006/0220347 | A1 | 10/2006 | Witchey | |
| 2007/0228693 | A1 | 10/2007 | Witchey | |
| 2015/0191949 | A1 * | 7/2015 | Wilson | E05C 19/003 292/259 R |
| 2018/0010369 | A1 | 1/2018 | Witchey | |
| 2018/0194320 | A1 | 7/2018 | Witchey | |
| 2019/0169895 | A1 * | 6/2019 | Canaday | E05C 19/003 |
| 2021/0213649 | A1 | 7/2021 | Ochi et al. | |

* cited by examiner

| TABLE 1 | |
|---|---|
| # | Description |
| 100 | extendable door lock 100 |
| 100s | extendable door lock sub-assembly 100s |
| 100c | extendable door lock 100c (i.e., fitted with a combination lock 270) |
| 101 | door 101 |
| 102 | a door jamb 102 |
| 102m | a metal door jamb 102m |
| 106 | exterior side 106 of a door 101 |
| 107 | lock mechanism 107 |
| 108 | a barrel lock 108 |
| 109b | a barrel lock housing 109b |
| 109c | a combination lock housing 109c |
| 110 | a first exterior side 110 of a door jamb 102 |
| 111 | a second exterior side 111 of a door jamb 102 |
| 112 | barrel lock key 112 |
| 113 | lock pin 113 |
| 115 | a door handle 115 |
| 120 | a first shaft 120 |
| 125 | proximal opposite end 125 of the first shaft 120 |
| 130 | a distal opposite end 130 of the first shaft 120 |
| 135 | a second shaft 135 |
| 140 | a first segment 140 of the second shaft 135 |
| 145 | a second segment 145 of the second shaft 135 |
| 147 | a third opposite end 147 of the second segment 145 |
| 149 | a fourth opposite end 149 of the second segment 145 |
| 150 | a constriction 150 in the first segment 140 of the second shaft 135 |
| 160 | a first opposite end 160 of the first segment 140 |
| 165 | a second opposite end 165 of the first segment 140 |
| 167 | first attachment hole 167 |
| 168 | second attachment hole 168 |
| 170 | a first mounting bracket 170 for receiving the distal opposite end 130 of the first shaft 120 |
| 175 | a second mounting bracket 175 for receiving the fourth opposite end 149 of the second segment 145 |
| 176 | a first interior washer plate 176 |
| 177 | a first principal end 177 of the extendable door lock 100 |
| 178 | a second principal end 178 of the extendable door lock 100 |
| 179 | a first plurality of washer plate holes 179 |
| 180 | an inner hole 180 in the first segment 140 |
| 185 | a plurality of first shaft holes 185 |

*FIG. 24A*

| TABLE 1 (continued) | |
|---|---|
| # | Description |
| 190 | an aligned first shaft hole 190 |
| 195 | a first tubular component 195 of the first mounting bracket 170 |
| 197 | a first cap 197 |
| 200 | a first base plate 200 of the first mounting bracket 170 |
| 205 | a first interior surface 205 of the first base plate 200 |
| 210 | a plurality of first base plate holes 210 |
| 215 | a first plurality of fasteners 215 |
| 217 | an interior side 217 of a door jamb 102 |
| 218 | an interior side 218 of a door 101 |
| 220 | a second tubular component 220 of the second mounting bracket 175 |
| 225 | a second cap 225 |
| 230 | a second base plate 230 of the second mounting bracket 175 |
| 235 | a second interior surface 235 of the second base plate 230 |
| 240 | a plurality of second base plate holes 240 |
| 245 | a second plurality of fasteners 245 |
| 250 | a second interior washer plate 250 |
| 260 | a second plurality of washer plate holes 260 |
| 265 | a spring-loaded combination lock 265 |
| 270 | a combination lock 270 |
| 270b | a combination lock 270b (not set using a combination lock set key 280) |
| 280 | a combination lock set key 280 |
| 290 | a lock bracket 290 |
| 295 | a bracket tongue 295 |
| 300 | a securing member 300 |
| 305 | a securing hole 305 |
| 310 | a spring 310 |
| 320 | a combination lock hook 320 |
| 340 | a lock bracket gap 340 |
| 344 | a lock bracket hole 344 |
| 346 | hook end 346 |
| 350 | hook gap |

*FIG. 24B*

| TABLE 1 (continued) | |
|---|---|
| # | Description |
| 360 | a first plurality of carriage bolts 360 |
| 370 | a first plurality of complementary bolt nuts 370 |
| 380 | shallow mushroom head 380 |
| 390 | point end 390 |
| 400 | longest carriage bolt 400 within the first plurality of carriage bolts 360 |
| 410 | optional first plurality of bolt covers 410 |
| 420 | a second plurality of carriage bolts 420 |
| 430 | a second plurality of complementary bolt nuts 430 |
| 440 | shallow mushroom head 440 |
| 450 | point end 450 |
| 460 | optional second plurality of bolt covers 460 |

*FIG. 24C*

EXTENDABLE DOOR LOCK

CROSS-REFERENCE TO RELATED APPLICATIONS

This application claims the benefit of U.S. Application No. 63/355,896, filed Jun. 27, 2022, the content of which is incorporated herein by reference in its entirety.

STATEMENT REGARDING FEDERALLY SPONSORED RESEARCH OR DEVELOPMENT

Not Applicable.

FIELD OF THE INVENTION

The invention relates to an extendable door lock.

BACKGROUND

Door locks are used, for example, to help prevent illicit passage through a door thereby helping to prevent theft or damage to contents in a room or facility located behind the door.

SUMMARY

In one non-limiting embodiment, the invention is an extendable door lock sub-assembly, comprising: a first shaft, a second shaft, and a lock mechanism.

The first shaft defines a proximal end and a distal end.

The second shaft comprises a first segment and an adjoining second segment. The first segment defining a first opposite end and a second opposite end, the second segment defining a third opposite end and a fourth opposite end. The second segment has a smaller cross-section than the first segment, wherein the third opposite end of the second segment is located inside the second opposite end of the first segment thereby defining a constriction in the first segment. The first opposite end of the first segment is sized to receive the proximal end of the first shaft. The first shaft is capable of telescoping into and out of the first segment, wherein the constriction prevents the first shaft entering the second segment.

The lock mechanism being located at least partly in a housing.

The first segment is perforated to provide an inner hole, the first shaft is perforated to provide a plurality of first shaft holes, wherein when the inner hole is aligned with one of the plurality of first shaft holes the lock mechanism is capable of engaging the inner hole with the aligned first shaft hole to prevent movement of the first shaft relative to the second shaft.

BRIEF DESCRIPTION OF THE DRAWINGS

FIGS. 24A, 24B and 24C are tables listing parts providing a useful point of reference.

Similar reference characters denote corresponding features consistently throughout the attached drawings.

DETAILED DESCRIPTION OF THE INVENTION

It is to be understood that the terms "top", "bottom", "left", "right", "side", "front", "rear", "upper", "upper", "lower", "vertical", "horizontal", "height", "width", "length", "end" and the like are used herein merely to describe points of reference and do not limit the present invention to any specific orientation or configuration. It should also be understood that the claimed invention and parts may be of any size, shape or configuration suitable for operation of the invention and may be constructed of any suitable materials. Still further, any and all dimensions if shown in attached Figures are example dimensions; dimensions (length, width, height) can vary from those shown.

The extendable door lock of the present invention is indicated generally by the numeral 100. It should be expressly understood that the extendable door lock 100 of the present invention can be used to help secure a variety of doors and hence is expressly not limited to a particular door. For example, the extendable door lock 100 can be used to secure doors such as office doors. For example, the extendable door lock 100 can be used to secure 'job site office doors' (found on construction sites).

Table 1 of parts (see FIGS. 24A, 24B, and 24C) is a useful point of reference.

Figure 1A:
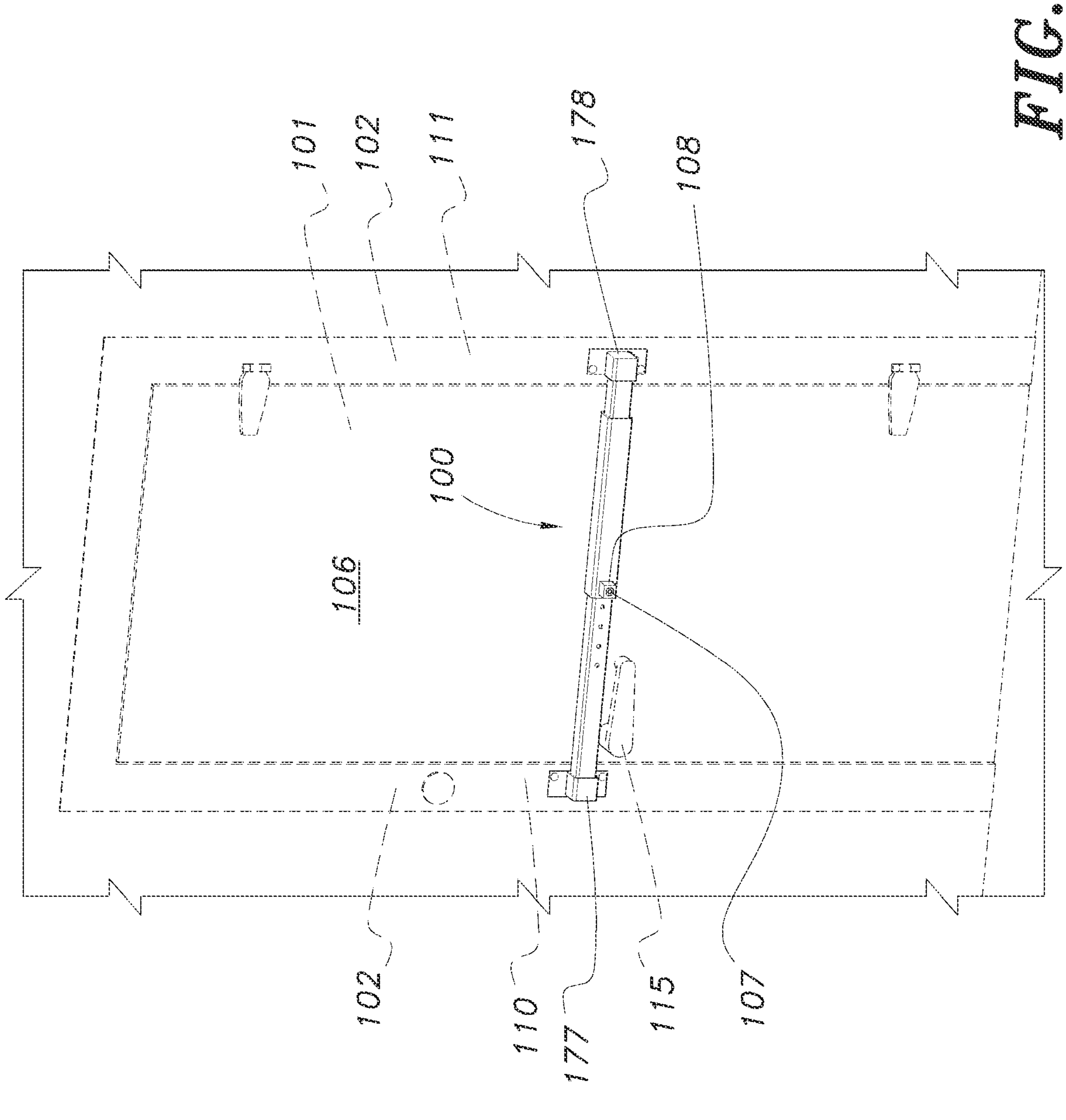
FIGS. 1A, 1B and 1C each show an environmental view of an extendable door lock according to the invention.

The extendable door lock 100 is typically applied across the exterior of a door see, for example, FIG. 1A) that opens outwards to help prevent illicit passage through a door 101 thereby helping to prevent theft or damage to contents in a room or facility located behind the door 101.

Figure 1B:
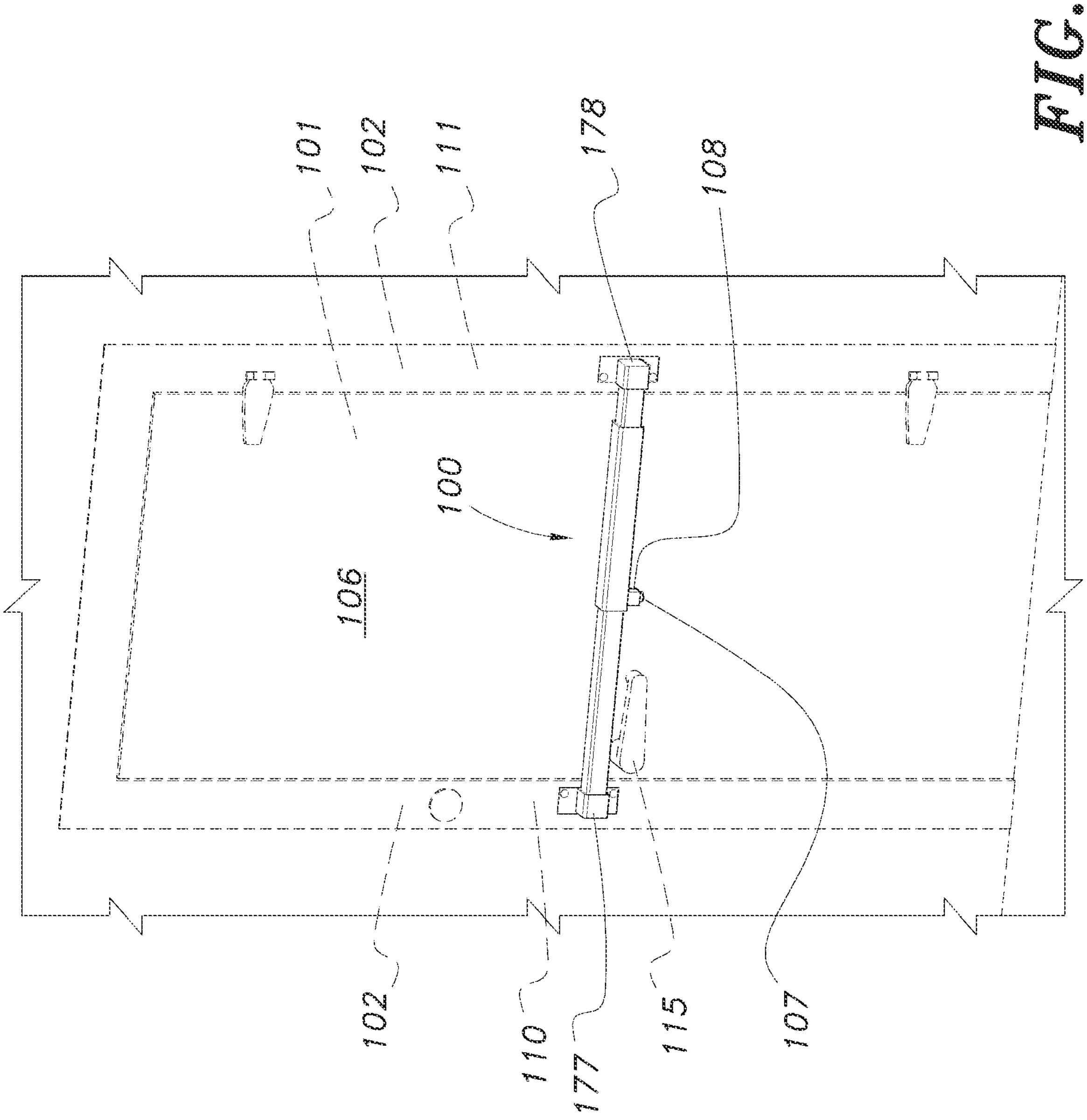
Figure 1C:
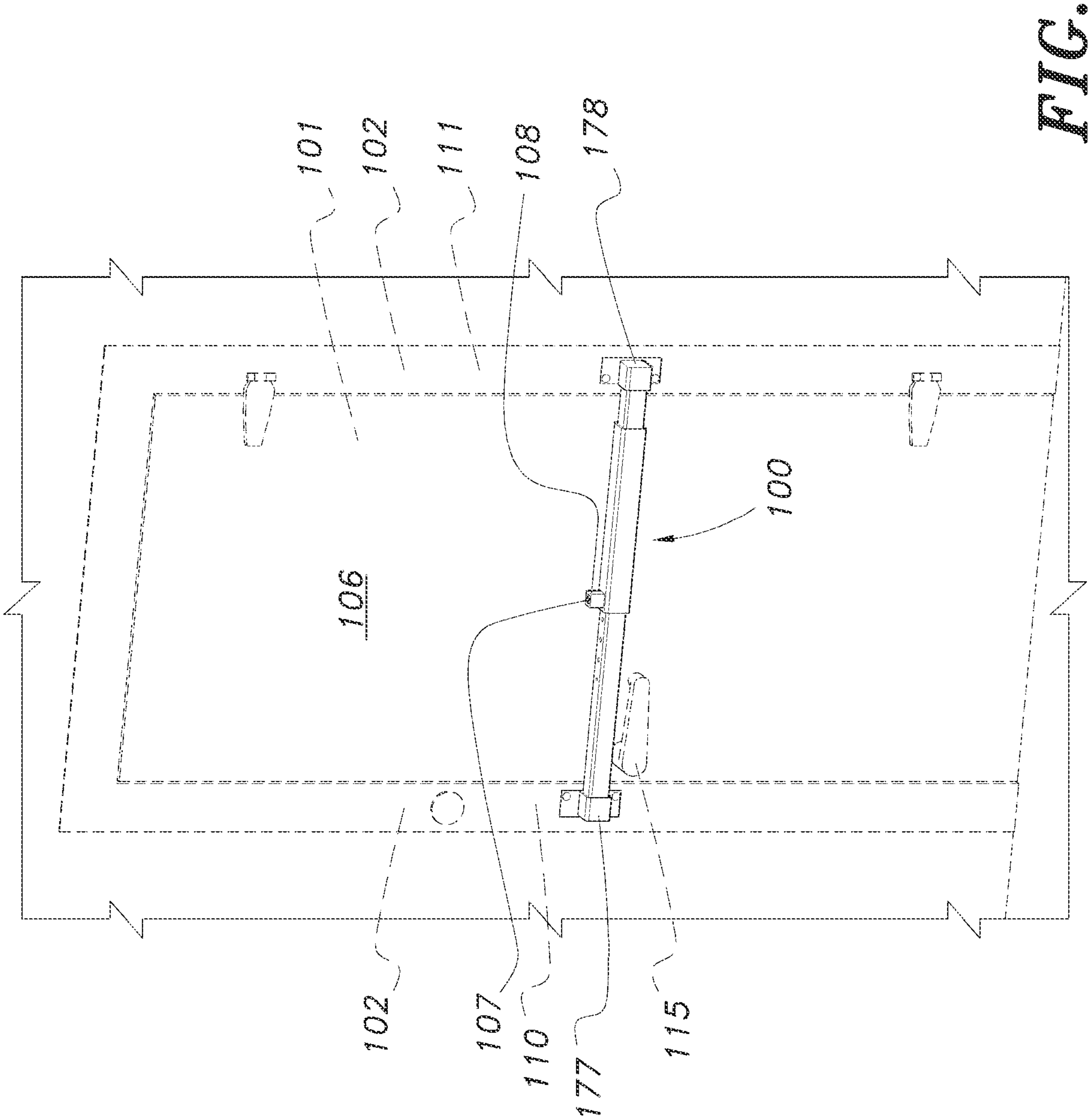

FIGS. 1A, 1B and 1C show an environmental view of the extendable door lock 100 applied across the exterior side 106 of a door 101. Specifically, the extendable door lock 100 is shown in three possible configurations wherein a lock mechanism 107 (shown in the in the form of a barrel lock 108) is shown pointing outwards (FIG. 1A), downwards (FIG. 1B), and upwards (FIG. 1C). The extendable door lock 100 can, for example, be placed across the exterior of a door 106 just above a door handle 115.

Still referring to FIGS. 1A, 1B and 1C, a door jamb 102, typically made of wood, defines: a first exterior side 110 of the door jamb 102, and a second exterior side 111 of the doorjamb 102. The extendable door lock 100 defines: a first principal end 177, and a second principal end 178 thereof. The first 177 principal end is shown attached to the first exterior side 110 of the door jamb 102. The second 178 principal end is shown attached to the second exterior side 111 of the door jamb 102.

Figure 2:
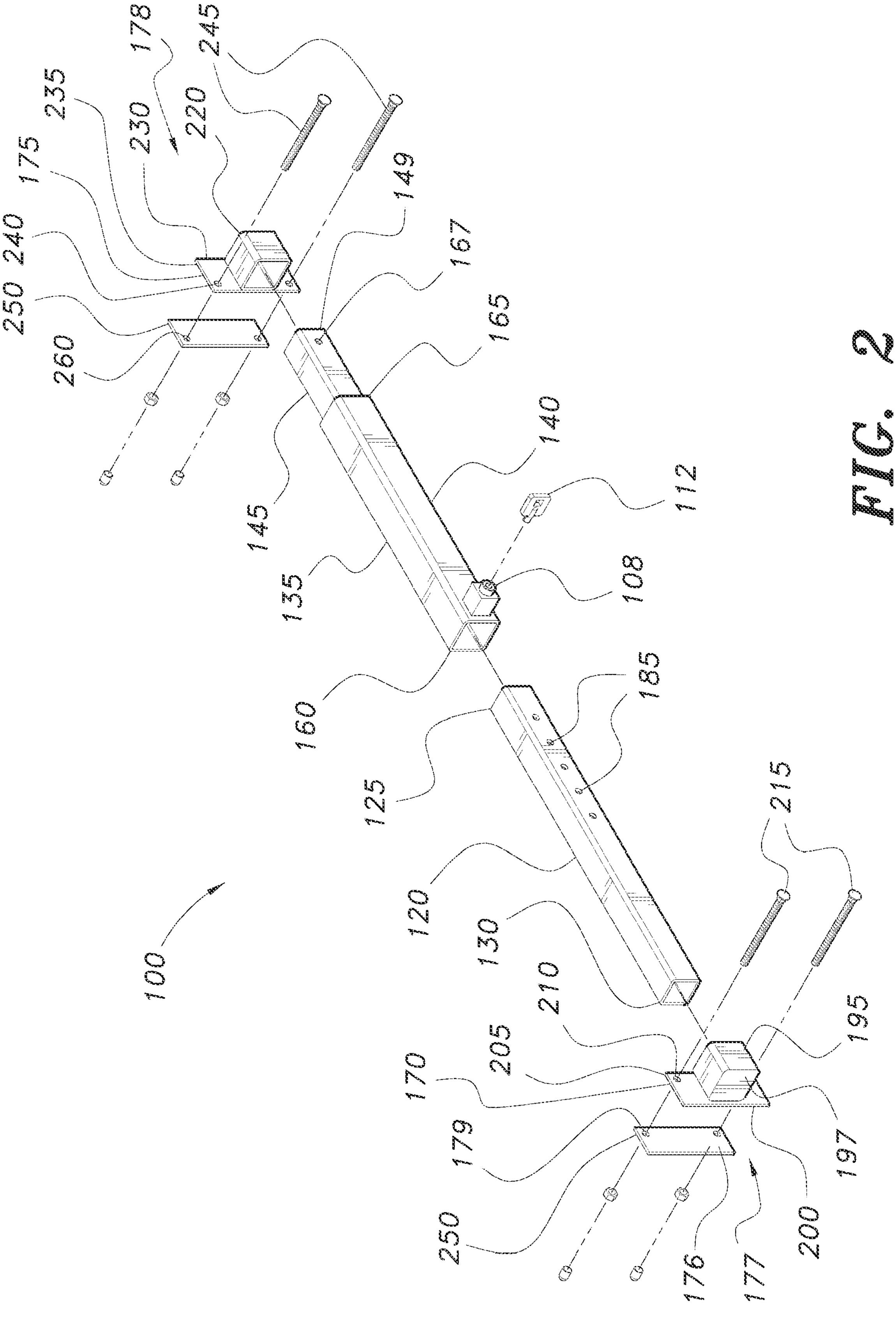
FIG. 2 shows an exploded view of an extendable door lock according to the invention.
Figure 3A:
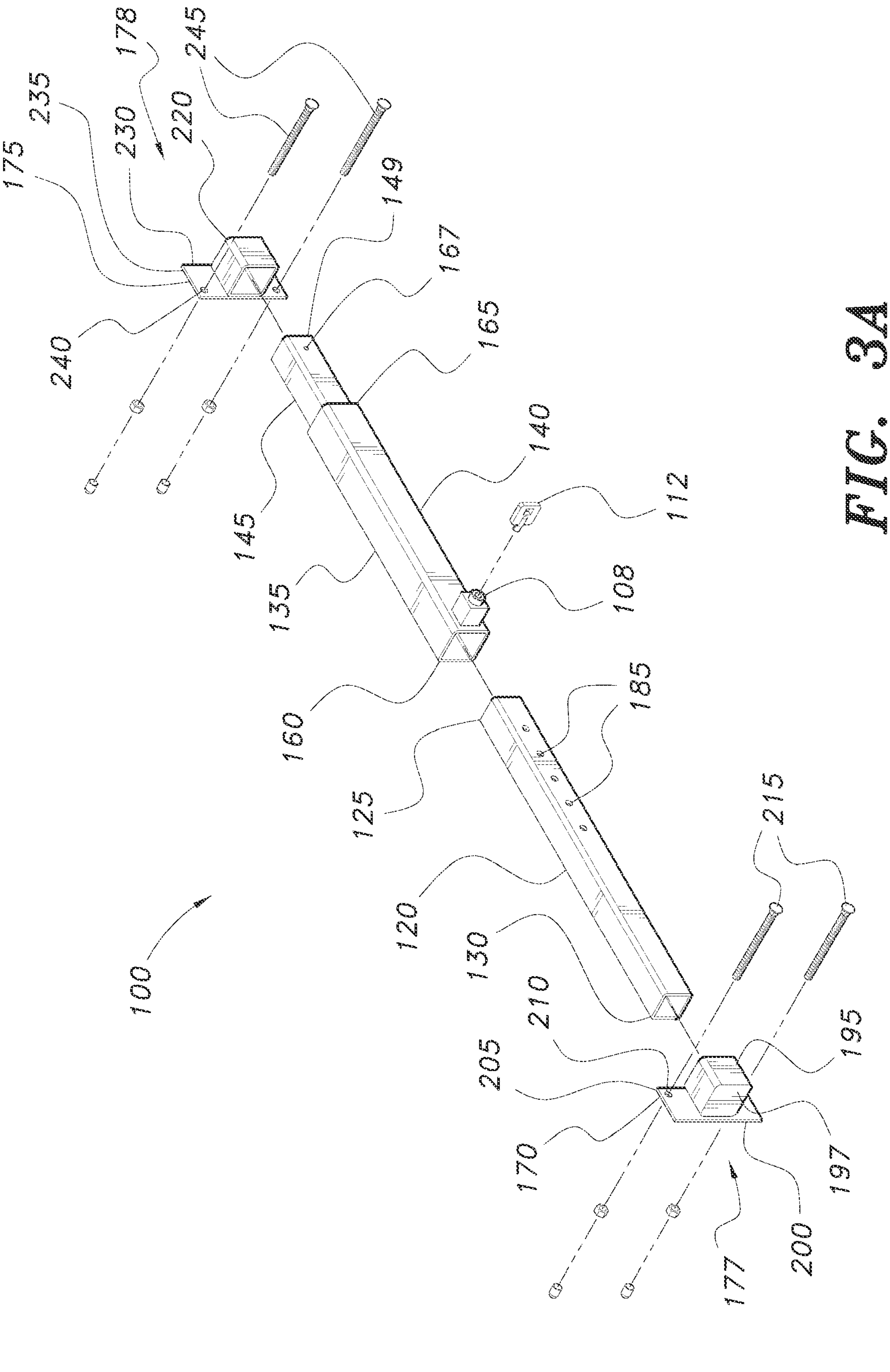
FIG. 3A shows an exploded view of an extendable door lock of FIG. 2 minus washer plates according to the invention.
Figure 3B:
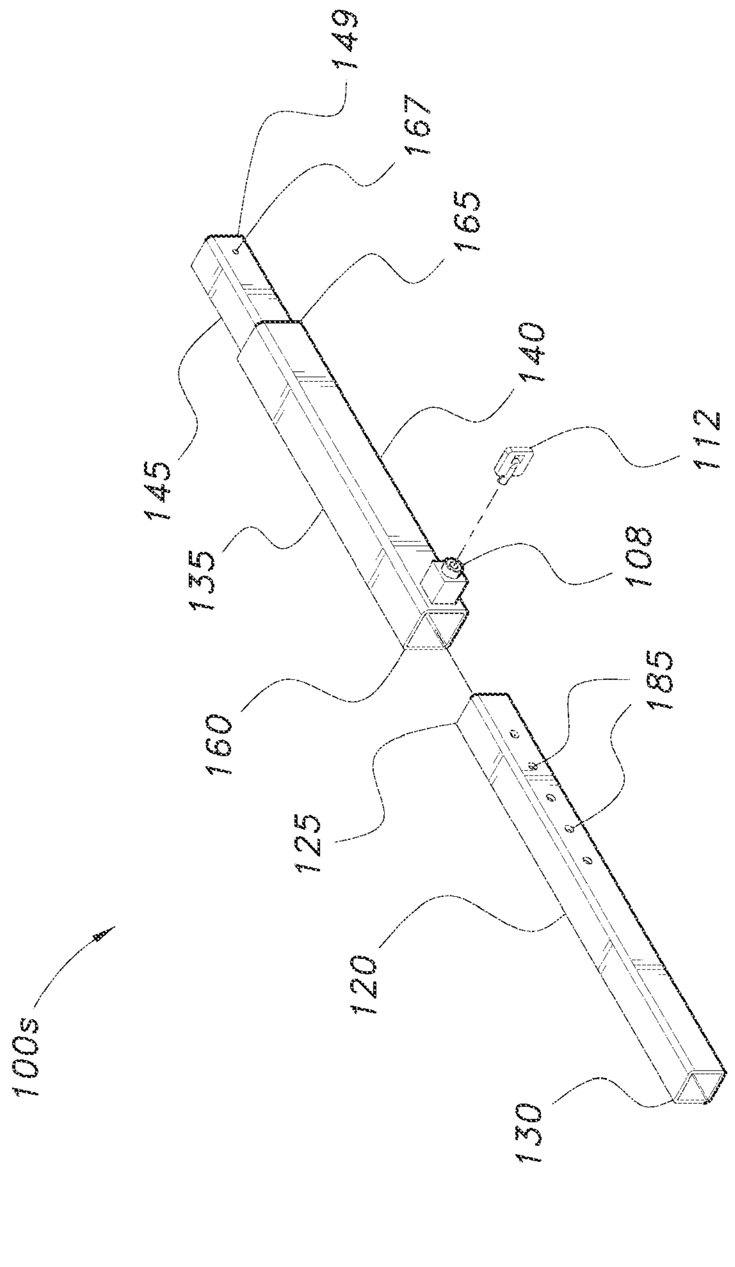
FIG. 3B shows an exploded view of an extendable door lock sub-assembly according to the invention.
Figure 4:
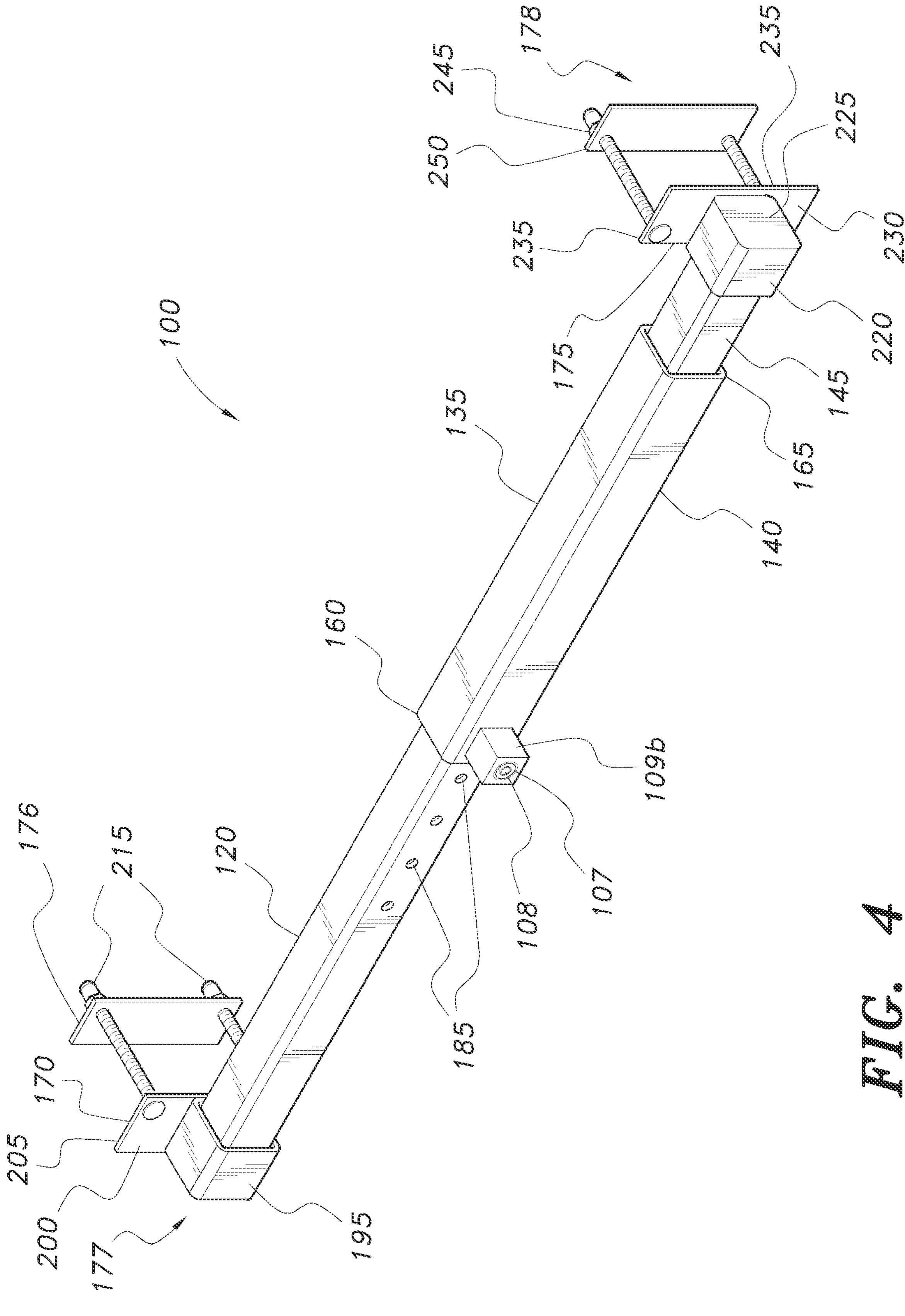
FIG. 4 shows a perspective view of an extendable door lock according to the invention.

It should be understood that the form of the lock mechanism 107 can vary and is expressly not limited to a barrel lock 108 shown in FIGS. 1A, 1B, and 1C, If present, the barrel lock 108 can be operated using any suitable key such as, but not limited, a barrel lock key 112 shown, for example, in FIG. 2.

Referring to FIGS. 2 through 8, the extendable door lock 100 comprises a first shaft 120, a second shaft 135, a first mounting bracket 170, a second mounting bracket 175, and the lock mechanism 107. (Note that FIG. 3B shows an exploded view of an extendable door lock sub-assembly 100*s* which does not include first 170 and second 175 mounting brackets.) The first 120 and second 135 shafts take the form of elongated hollow members.

The first shaft 120 defines a proximal opposite end 125 and a distal opposite end 130. The second shaft 135 comprises a first segment 140 and an adjoining second segment 145. The first segment 140 defines a first opposite end 160 and a second opposite end 165, wherein the lock mechanism 107 in the form of a barrel lock 108, is at least partly located in a barrel lock housing 109*b*. The barrel lock housing 109*b* and lock mechanism 107 is shown located proximate to the first opposite end 160 of the first segment 140. It should be understood that the location of the lock mechanism 107 and housing 109*b* can vary and need not be located proximate to the first opposite end 160 of the first segment 140.

The second segment 145 defines a third opposite end 147 and a fourth opposite end 149. The second segment 145 has a smaller cross-section than the first segment 140. The third opposite end 147 of the second segment 145 is located inside the second opposite end 165 of the first segment 140 thereby defining a constriction 150 in the first segment 140 of the second shaft 135. The first shaft 120 is capable of telescoping into and out of the first segment 140 except that the constriction 150 prevents the proximal end 125 of first shaft 120 entering the second segment 145 and hence prevents the first shaft 120 entering the second segment 145.

Specifically, the first opposite end 160 of the first segment is sized to receive the proximal end 125 of the first shaft 120 (see, for example, the exploded view shown in FIG. 2), wherein the first shaft 120 is capable of telescoping into and out of the first segment 140 except that the constriction 150 prevents the first shaft 120 entering the second segment 145.

Figure 5:
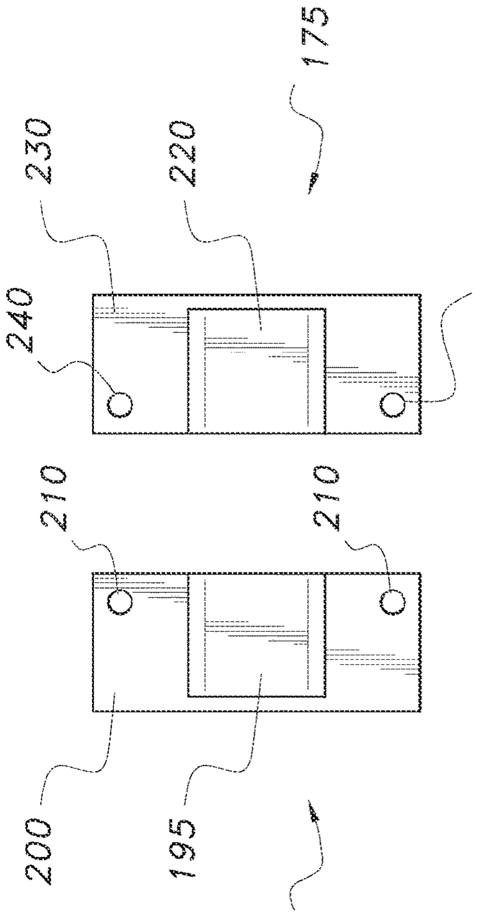
FIG. 5 shows a top planar view of first and second mounting brackets according to the invention.

The first mounting bracket 170 is configured to receive the distal opposite end 130 of the first shaft 120; wherein the first mounting bracket 170 comprises a first tubular component 195 and a first base plate 200. For example, the first tubular component 195 of the first mounting bracket 170 receives the distal opposite end 130 of the first shaft 120, the first tubular component 195 being capped off by a first cap 197 (the first cap 197 forms an integral part of first tubular component 195; for example, see FIG. 3A). The first tubular component 195 is attached to the first base plate 200. The first base plate 200 defines a first interior surface 205 which during installation rests against a first exterior side 110 of a door jamb 102. The first base plate 200 having a plurality of first base plate holes 210 there-through (FIG. 5 shows two first base plate holes 210). A first plurality of fasteners 215 are used to connect the first mounting bracket 170 to the door jamb 102.

Figure 9:
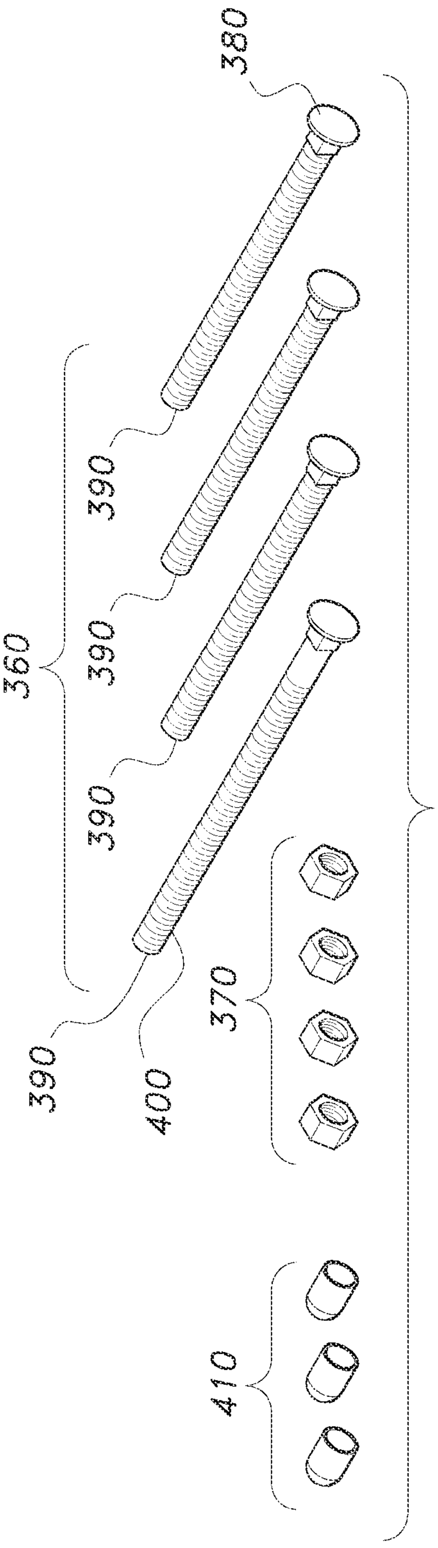
FIG. 9 shows a perspective view of an array of carriage bolts and associated items according to the invention.

Referring to FIG. 9, the first plurality of fasteners may comprise a first plurality of carriage bolts 360 and a first plurality of complementary bolt nuts 370 (see FIG. 9). Each of the first plurality of carriage bolts 360 has a shallow mushroom head 380 and a point end 390. One of the first plurality of carriage bolts 360 is longer in length than the rest (the longest carriage bolt is labeled "400" in FIG. 9). An optional first plurality of bolt covers 410 are used to cover the point ends 390 except for the point end of the longest bolt 400.

Figure 10:
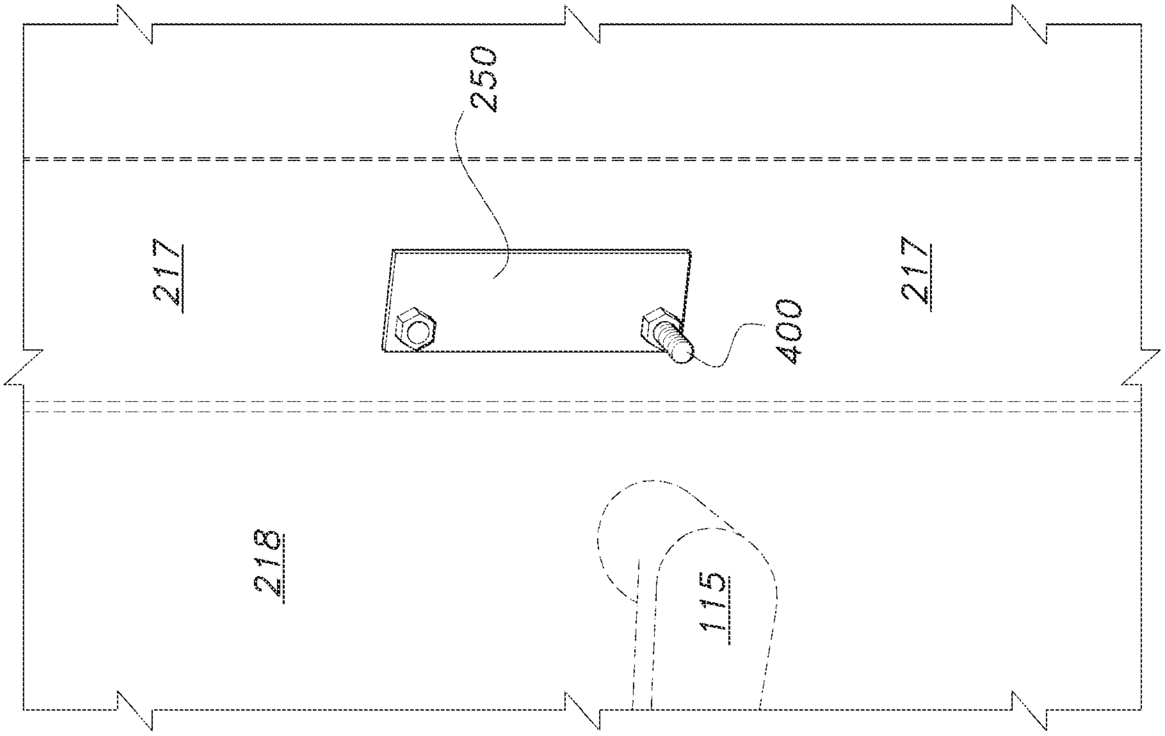
FIG. 10 shows an interior side of a door jamb fitted with an interior washer plate with a longest carriage bolt protruding therefrom for insertion into a first or second attachment hole according to the invention.
Figure 11:
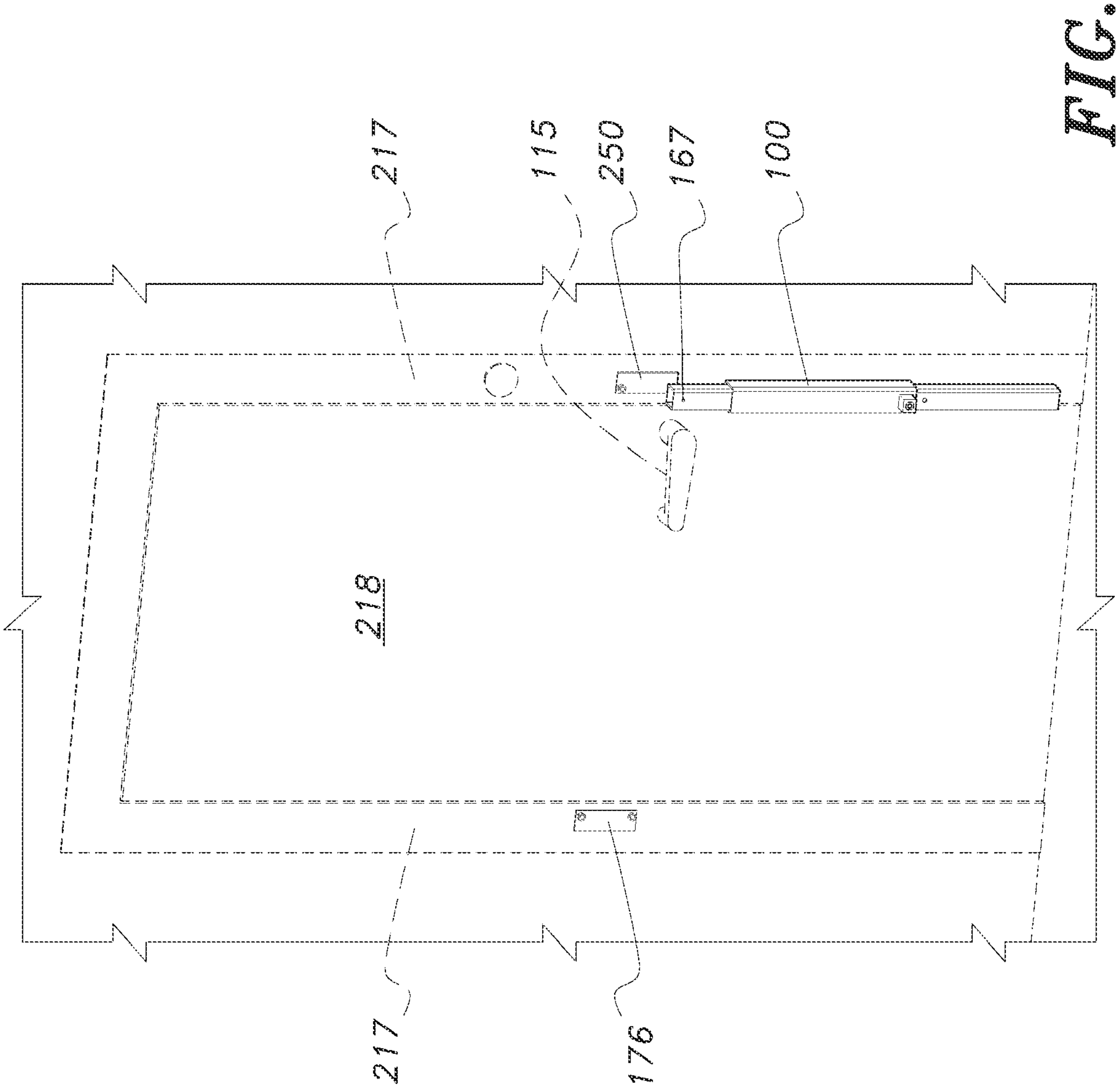
FIG. 11 shows an extendable door lock in a storage mode according to the invention.

Referring to FIGS. 10 and 11, the purpose of the longer bolt 400 is revealed. Specifically, when the extendable door lock 100 is not in use it can be hung from the longest carriage bolt 400. For example, the longest bolt 400 can be inserted into the second attachment hole 168 (shown in FIG. 7) and thereafter the extendable door lock 100 is hung from the longest bolt 400. The longest bolt 400 can also be inserted into the first attachment hole 167 (shown in FIG. 6) and thereafter the extendable door lock 100 is hung from the longest bolt 400. Alternatively, the longest bolt 400 can be inserted into one of the plurality of first shaft holes 185 (shown, for example, in FIG. 2) and thereafter the extendable door lock 100 is hung from the longest bolt 400.

In one embodiment, a first interior washer plate 176 is used in conjunction with the first plurality of fasteners 215 to secure the first principal end 177 of the extendable door lock 100 to the interior side 217 of a door jamb 102; for reference, the interior side 217 of a door jamb 102, as is the interior side 218 of door 101, is shown in FIG. 10. The first interior washer plate 176 defines a first plurality of washer plate holes 179 therethrough; the first plurality of washer plate holes 179 is shown, for example, in FIG. 2. During installation the door jamb 102 is drilled through to provide through holes to accommodate the first plurality of fasteners 215 therethrough. The first plurality of fasteners 215 are then used to secure the first interior washer plate 176 to the interior side 217 of a door jamb 102.

The second mounting bracket 175 is configured to receive the fourth opposite end 149 of the second segment 145; wherein the second mounting bracket 175 comprises a second tubular component 220 and a second base plate 230. For example, the second tubular component 220 of the second mounting bracket 175 receives the fourth opposite end 149 of the second segment 145, the second tubular component 220 being capped off by a second cap 225 (the second cap 225 forms an integral part of second tubular component 220; for example, see FIG. 4). The second tubular component 220 is attached to a second base plate 230. The second base plate 230 defines a second interior surface 235 which during installation rests against the second exterior side 111 of door jamb 102. The second base plate 230 having a plurality of second base plate holes 240 there-through (FIG. 5, for example, shows two second base plate holes 240). A second plurality of fasteners 245 are used to connect the second mounting bracket 175 to the door jamb 102.

Figure 12:
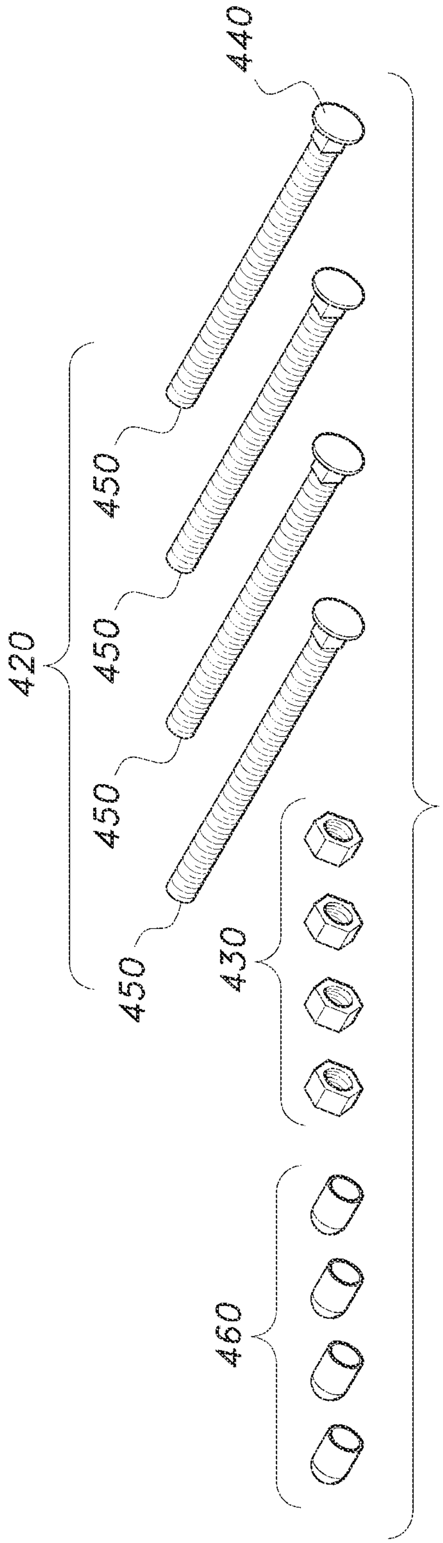
FIG. 12 shows a perspective view of an array of carriage bolts and associated items according to the invention.

Referring to FIG. 12, the second plurality of fasteners may comprise a second plurality of carriage bolts 420 and a second plurality of complementary bolt nuts 430. Each of the second plurality of carriage bolts 420 are of equal length, possess a shallow mushroom head 440 and a point end 450. An optional second plurality of bolt covers 460 are used to cover the point end 450 of each carriage bolt 420.

In one embodiment, the first plurality of fasteners 215 and second plurality of fasteners 245 are of equal length except that one fastener 400 is of longer length than the remaining fasteners, and wherein when the extendable door lock 100 is not in use the extendable door lock 100 is capable of being hung from the longer fastener 400.

In one embodiment, a second interior washer plate 250 is used in conjunction with the second plurality of fasteners 245 to secure a second principal end 178 of the extendable door lock 100 to the interior side 217 of a door jamb 102 (see FIG. 10). The second interior washer plate 250 defines a second plurality of washer plate holes 260 therethrough; the second plurality of washer plate holes 260 is shown, for example, in FIG. 2. During installation the door jamb 102 is drilled through to provide through holes to accommodate the second plurality of fasteners 245 therethrough. The second plurality of fasteners 245 are then used to secure the second interior washer plate 250 to the interior side 217 of a door jamb 102; for reference, the interior side 217 of a door jamb 102 is shown in FIG. 10. (The use of the first interior washer plate 176 and the second interior washer plate 250 are entirely optional; for example, the first 176 and second 250 interior washer plates are not shown in FIGS. 3 and 15.)

Figure 13:
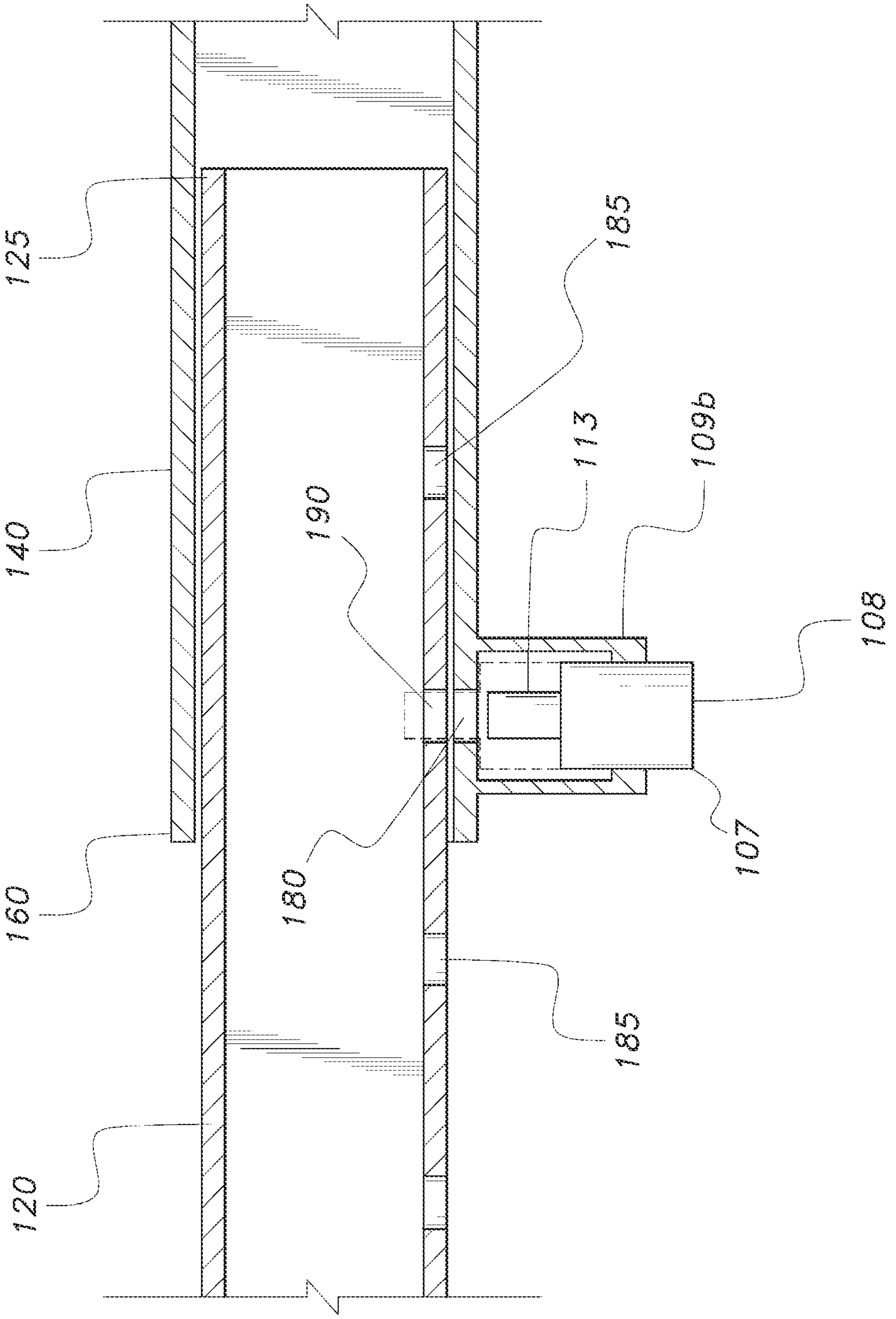
FIG. 13 shows a longitudinal section view of a first shaft and a first segment of an extendable door lock in the vicinity of a lock mechanism according to the invention.

FIG. 13 shows a longitudinal section view of the first shaft 120 and first segment 140 of the second shaft 135 in the vicinity of the lock mechanism 107 (in this instance barrel lock 108). The first segment 140 is perforated to provide an inner hole 180. The first shaft 120 is perforated to provide a plurality of first shaft holes 185 (also shown, for example, in FIG. 2), wherein when the inner hole 180 is aligned with one of the plurality of first shaft holes 185 (labeled 190) the lock mechanism 107 (i.e., the barrel lock 108) is capable of engaging the inner hole 180 with the aligned first shaft hole 190 to prevent movement of the first shaft 120 relative to the second shaft 135. (The longest bolt 400, discussed above, can also be inserted into one of the plurality of first shaft holes 185 and the extendable door lock 100 hung therefrom.)

Still referring to FIG. 13, the barrel lock 108 has a lock pin 113; the barrel lock 108 is at least partly located in a housing 109*b*. The barrel lock 108 is shown in its unlocked position in solid lines. The barrel lock 108 may be moved to a locked position, shown in phantom, in which the lock pin 113 is inserted through an inner hole 180 in the first segment 140 and one of a plurality of first shaft holes 185; more specifically, when the inner hole 180 is aligned with one of the plurality of first shaft holes 185 (for convenience labeled 190) the barrel lock 108 is capable of engaging the inner hole 180 with the aligned first shaft hole 190 to prevent movement of the first shaft 120 relative to the second shaft 135.

Figure 14:
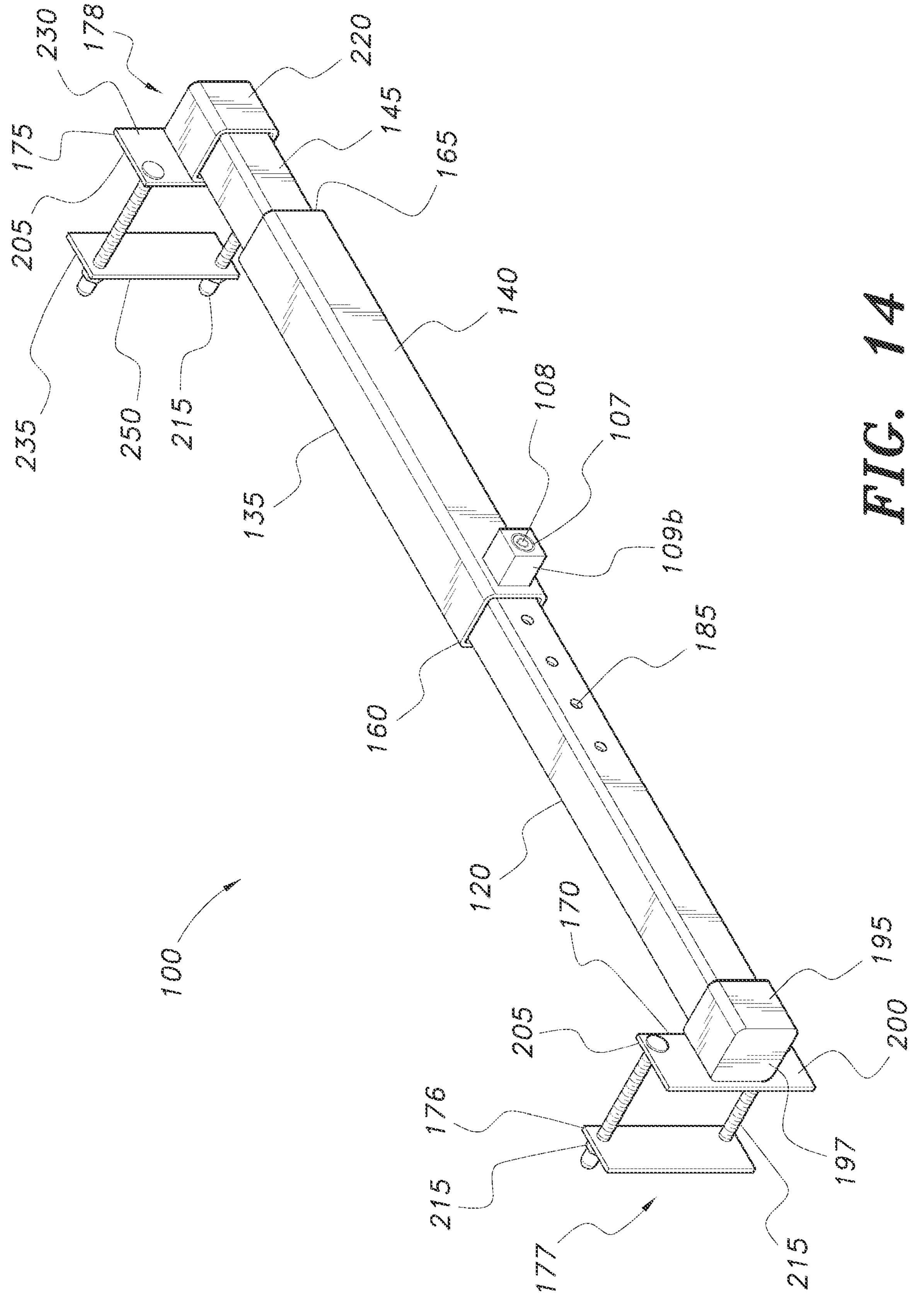
FIG. 14 shows a perspective view of an extendable door lock with a lock mechanism in a locked configuration according to the invention.
Figure 15:
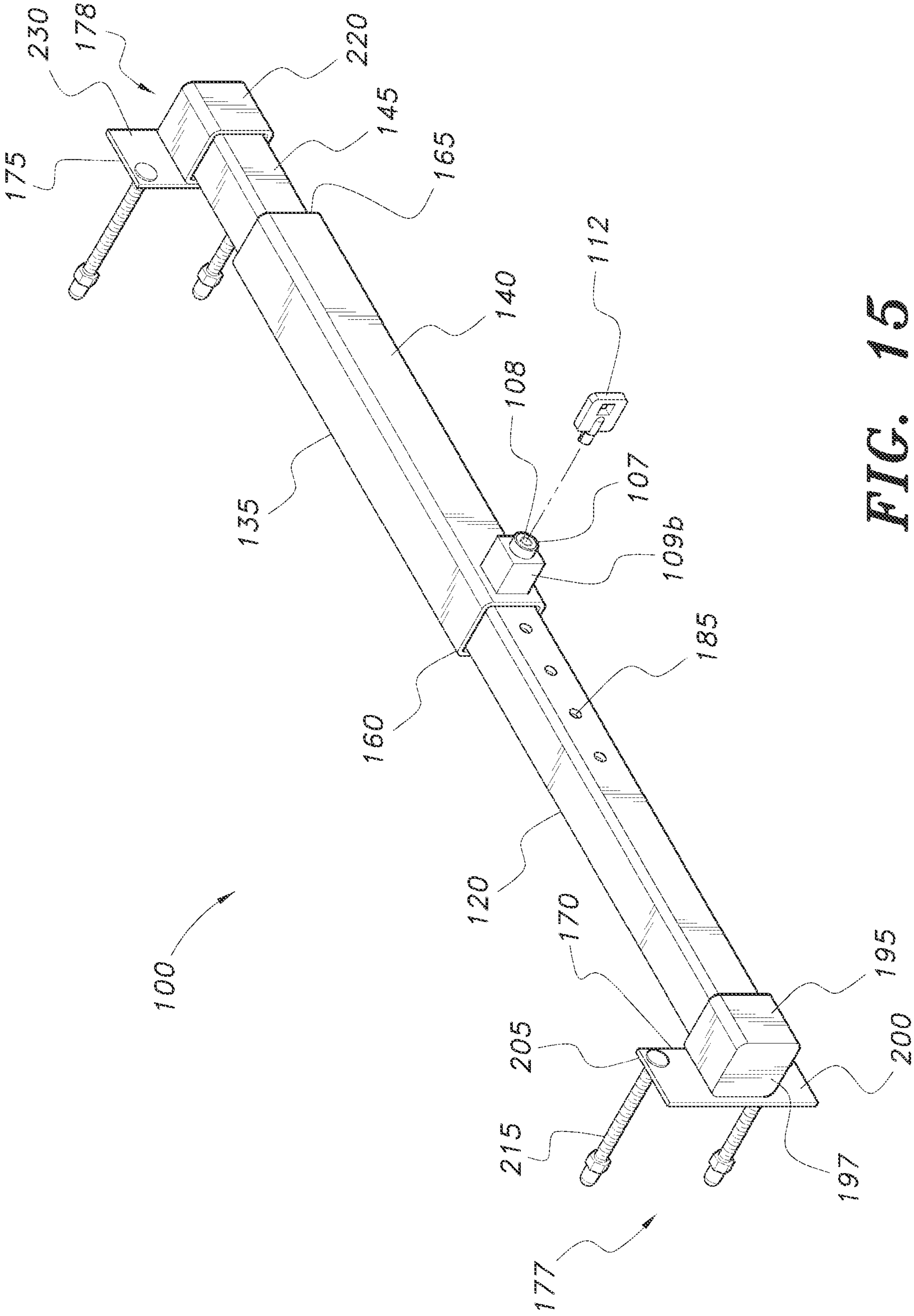
FIG. 15 shows a perspective view of the extendable door lock of FIG. 14 (minus first and second interior washer plates) with the lock mechanism in an unlocked configuration according to the invention.

Referring now to FIGS. 14 and 15 of which FIG. 14 shows the barrel lock 108 in a locked configuration. The barrel lock 108 is shown in an unlocked configuration in FIG. 15. The barrel lock 108 is operated using barrel lock key 112.

Figure 16:
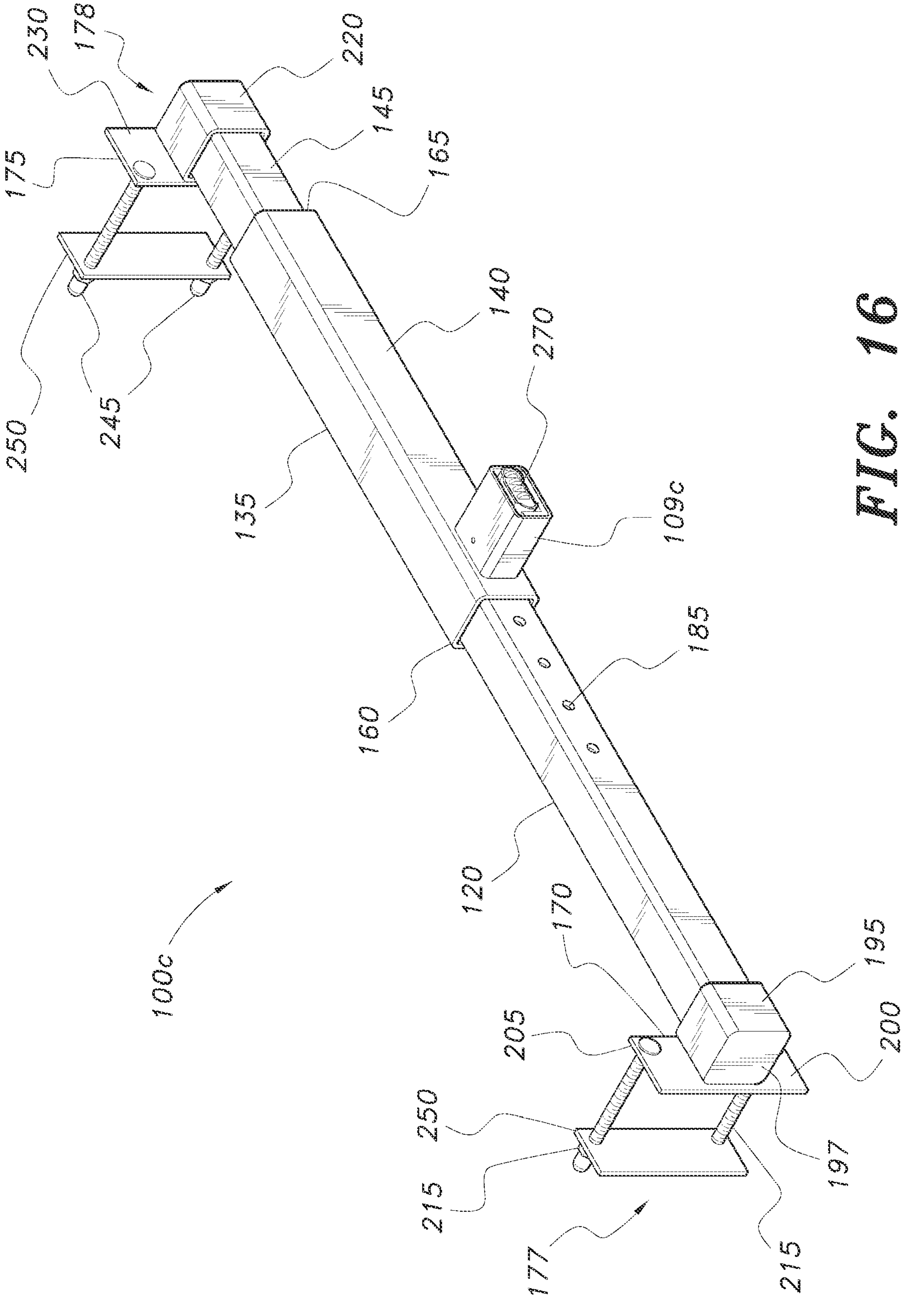
FIG. 16 shows a perspective view of an extendable door lock with a lock mechanism in the form of a spring-loaded combination lock in a locked configuration according to the invention.
Figure 18:
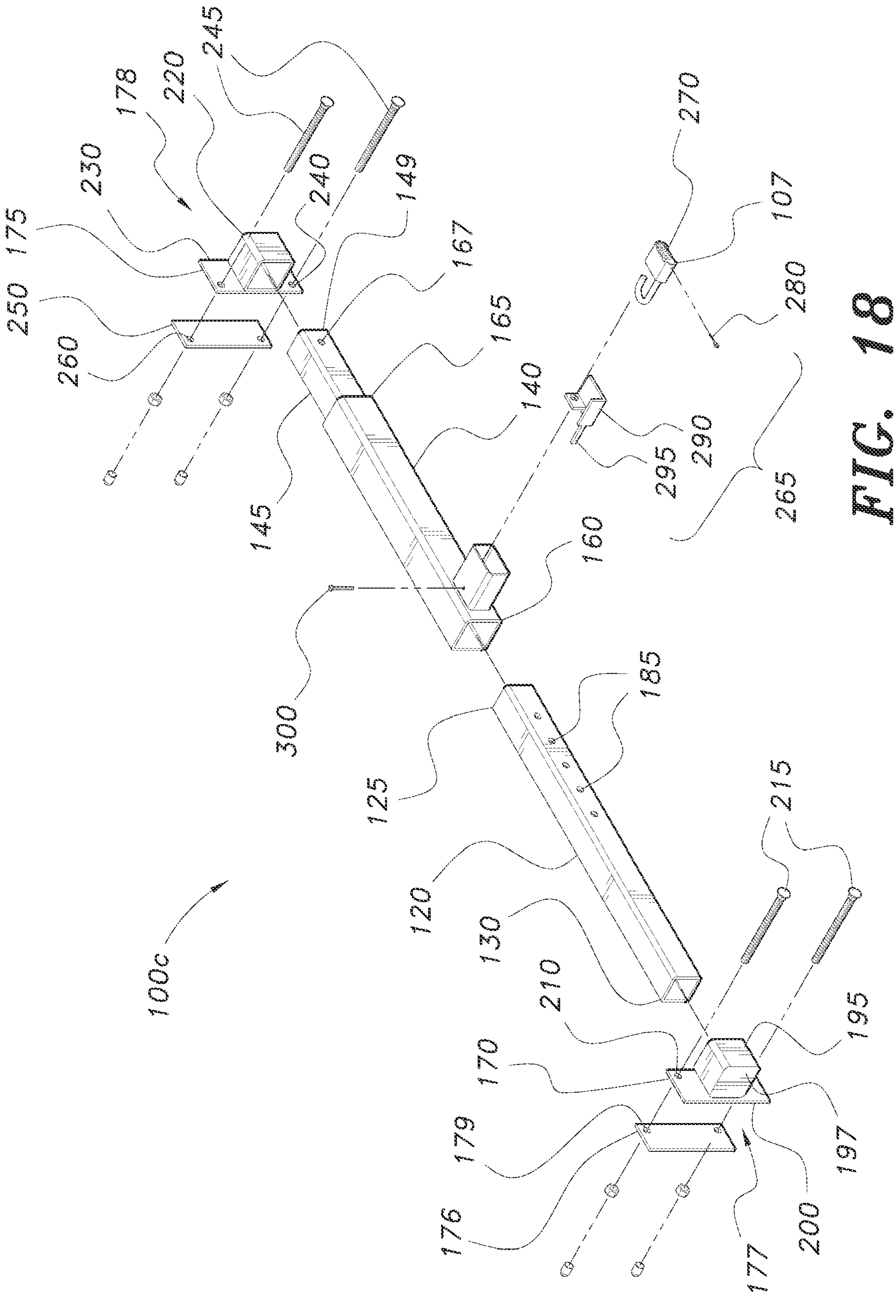
FIG. 18 shows an exploded view of the extendable door lock of FIG. 16 according to the invention.
Figure 19:
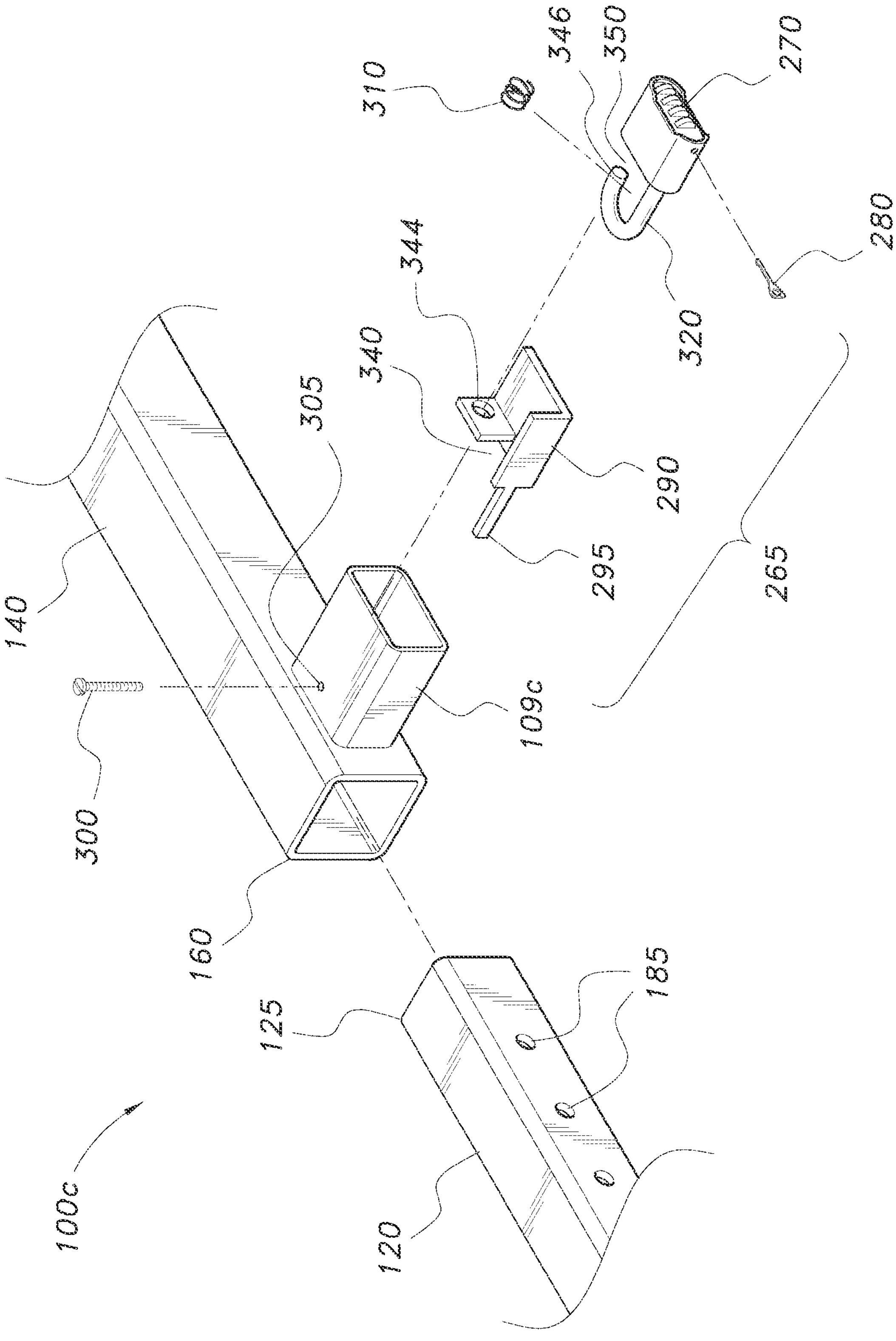
FIG. 19 shows a close up exploded view of the extendable door lock of FIG. 18 according to the invention.
Figure 23A:
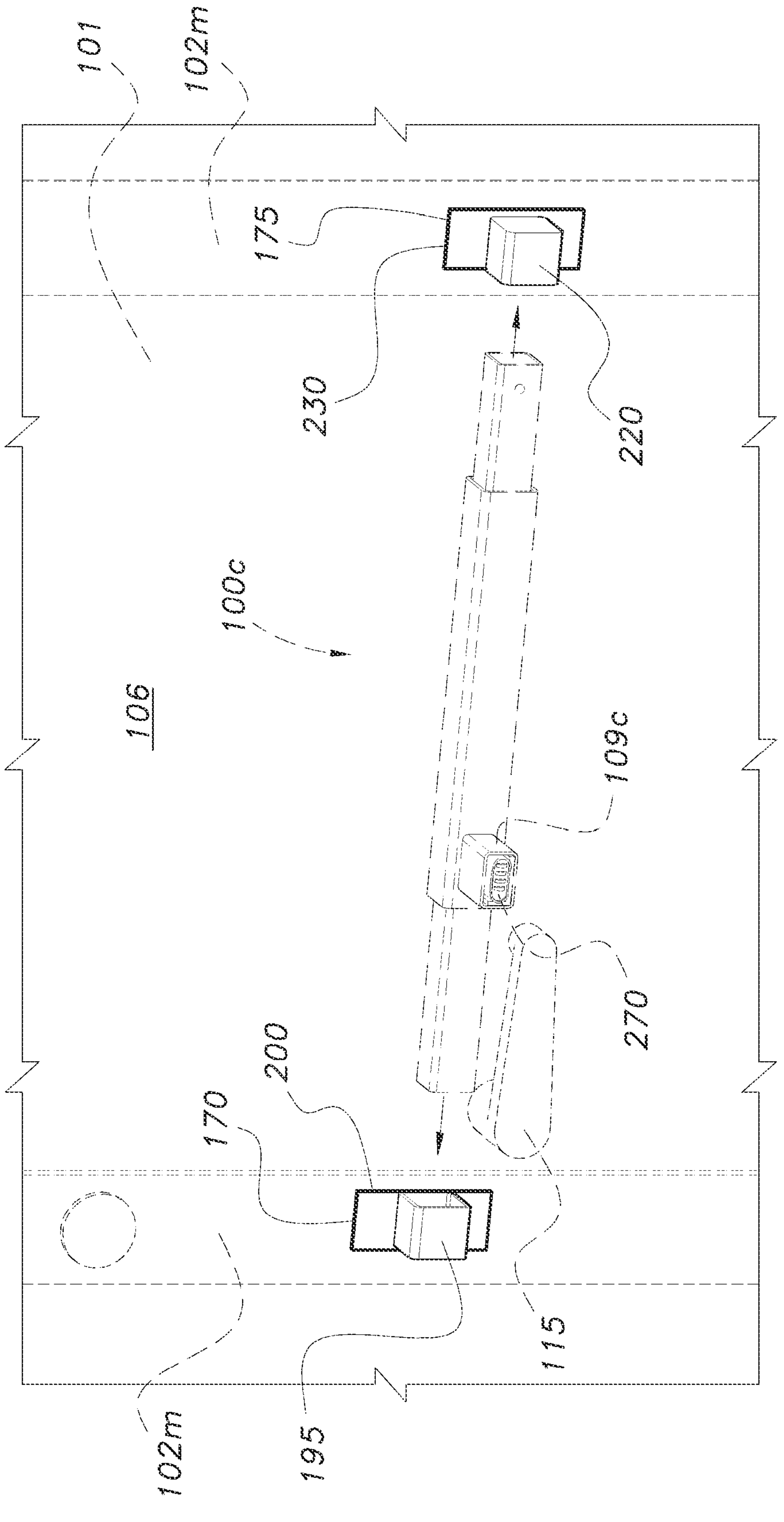
Figure 23B:
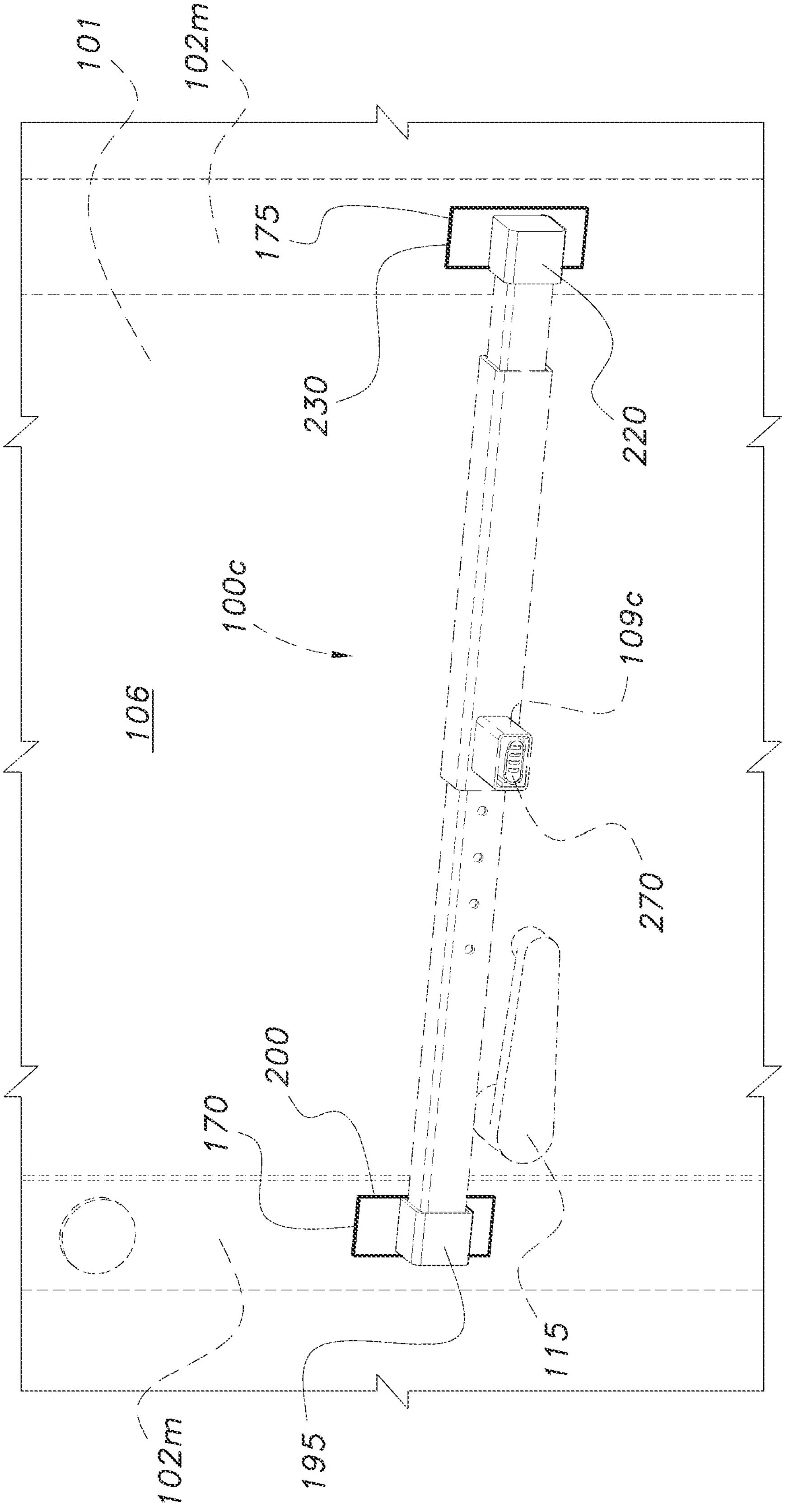

FIG. 16 shows a combination lock 270 which forms part of a spring-loaded combination lock 265 (shown, for example, in FIG. 19). The combination lock 270 is shown in its locked position mostly surrounded by housing 109*c*. The label "100*c*" refers to an extendable door lock fitted with a combination lock 270. (The label "100*c*" is used throughout FIGS. 16 through 19; and FIGS. 23A and 23B.)

Figure 17A:
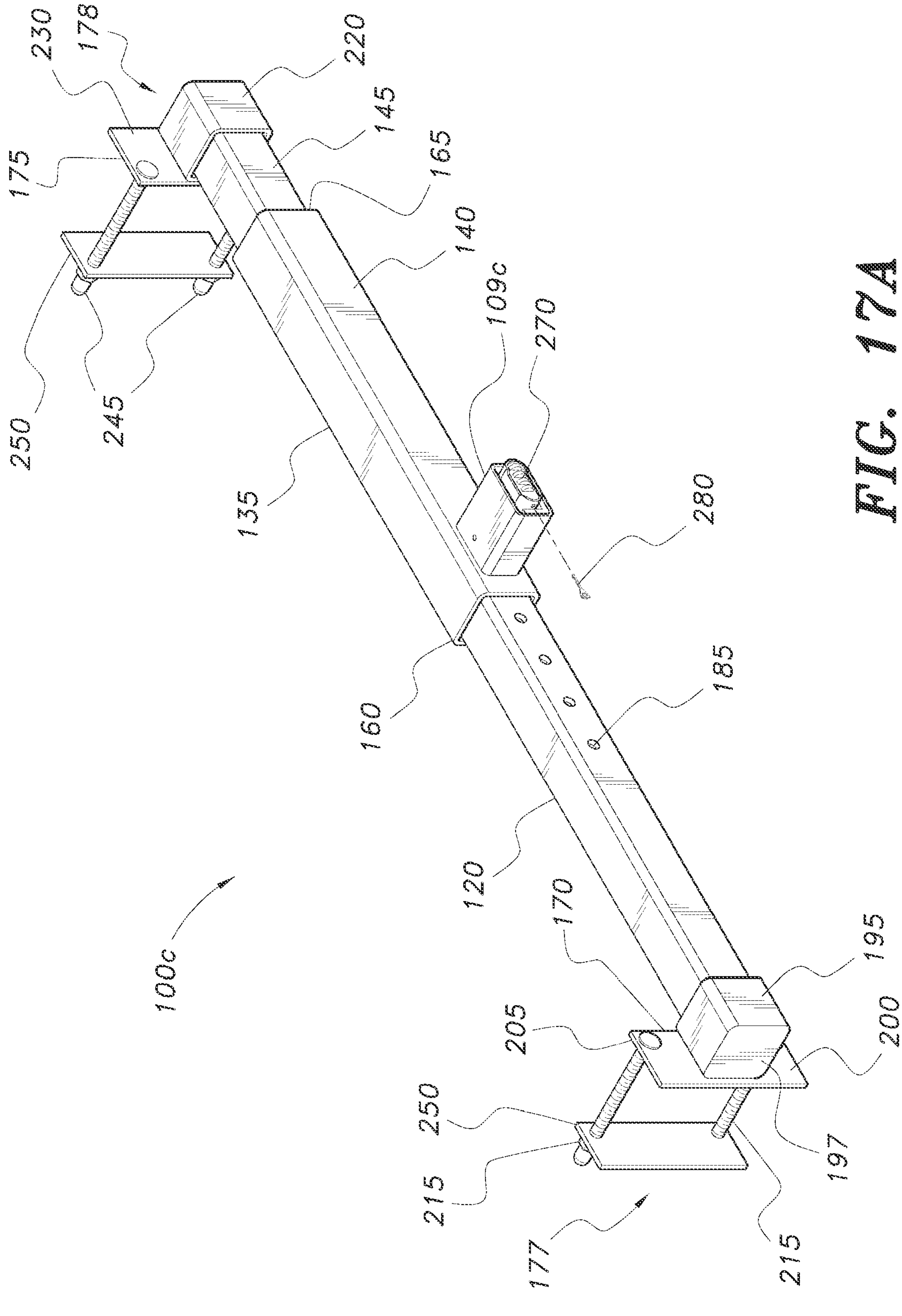
FIG. 17A shows a perspective view of the extendable door lock of FIG. 16 with the lock mechanism in the form of a spring-loaded combination lock in an unlocked configuration according to the invention.
Figure 17B:
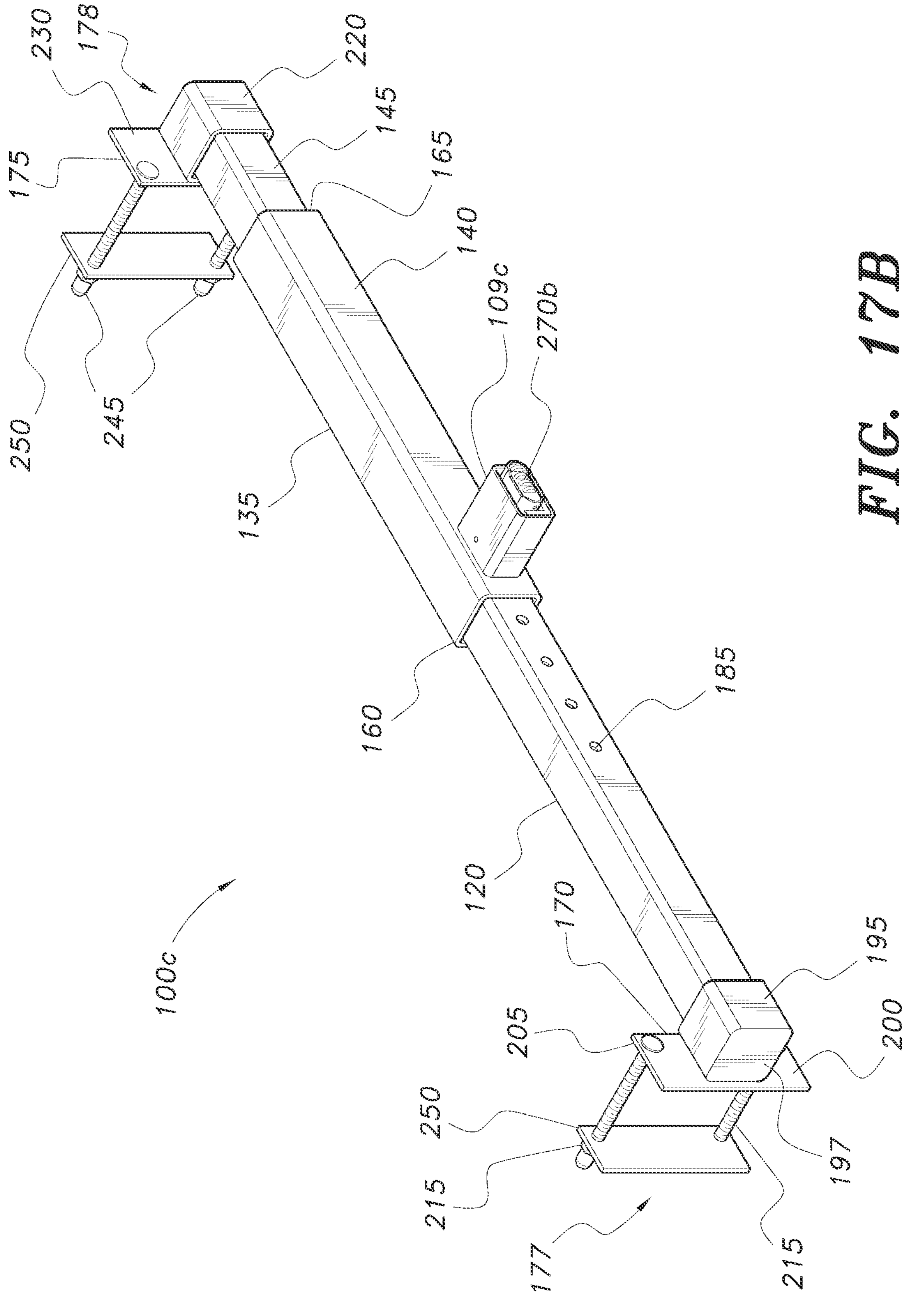
FIG. 17B shows a perspective view of the extendable door lock of FIG. 16 with the lock mechanism in the form of a spring-loaded combination lock in an unlocked configuration minus combination lock set key 280.

In FIG. 17, the combination lock 270 is shown in its unlocked position. The combination lock 270 is partly protruding from housing 109*c*. A combination lock set key 280 is used to set the combination of the combination lock 270 while the combination lock 270 is in its unlocked position. It should be understood that the combination lock set key 280 is optional such that the combination lock is opened solely by finger input by a human (not shown in FIG. 17); a combination lock lacking a combination lock set key 280 is shown in FIG. 17A and is labeled 270*b*.

FIG. 18 shows an exploded view of a lock mechanism 107 in the form of a spring-loaded combination lock 265. The spring-loaded combination lock 265, which includes the combination lock 270, further comprises a lock bracket 290 used to hold the combination lock 270. A bracket tongue 295 extends from the lock bracket 290. A securing member 300 is used to secure the combination lock 270 in the combination lock housing 109*c*. During installation of the combination lock 270, the securing member 300 is inserted into the spring-loaded combination lock 265 via a securing hole 305 (shown in FIG. 19).

FIG. 19 provides a close up view of the spring-loaded combination lock 265. A lock bracket gap 340 is located in the lock bracket 290. The lock bracket 290 defines a lock bracket hole 344. A combination lock hook 320 fits through the lock bracket gap 340 allowing hook end 346 of the combination lock hook 320 to fit through the lock bracket hole 344. As can be seen in FIG. 19, the spring-loaded combination lock 265 further comprises a spring 310. The combination lock hook 320 is shown in an unlocked configuration with hook gap 350 visible. The spring 310 is confined within the confines of the combination lock hook 320.

Figure 20:
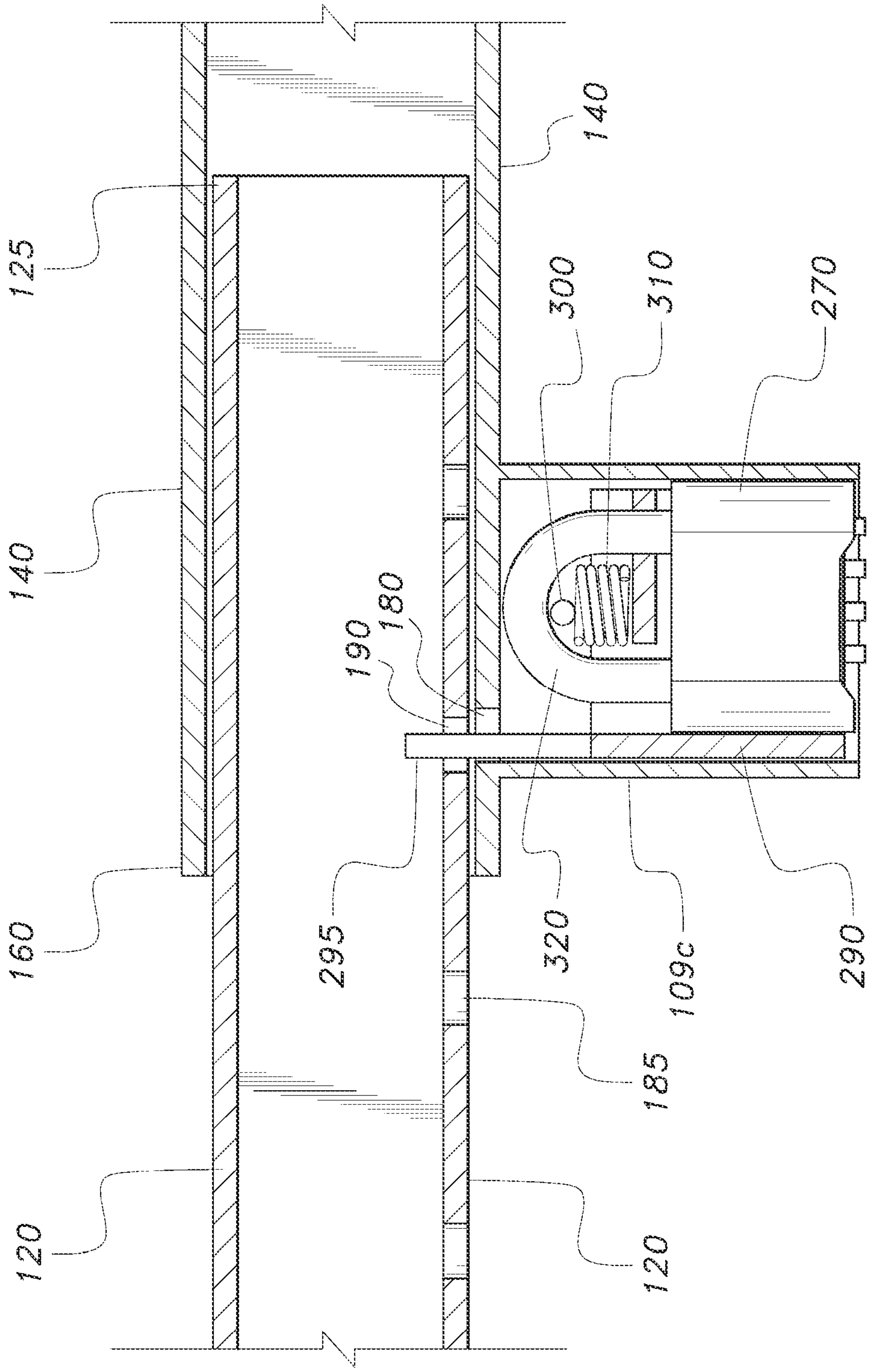
FIG. 20 shows a schematic longitudinal section view of a first shaft and a first segment of an extendable door lock in the vicinity of a lock mechanism in the form of a spring-loaded combination lock in a locked configuration according to the invention.

FIG. 20 shows a schematic longitudinal section view of the spring-loaded combination lock 265 with the combination lock 270 in its locked configuration. The combination lock hook 320 is shown in a locked position with the spring 310 compressed. The bracket tongue 295 is shown inserted through an inner hole 180 in the first segment 140 and one of a plurality of first shaft holes 185; more specifically, when the inner hole 180 is aligned with one of the plurality of first shaft holes 185 (for convenience labeled 190) the combination lock 270 is capable of engaging the inner hole 180 with the aligned first shaft hole 190 to prevent movement of the first shaft 120 relative to the second shaft 135.

Figure 21:
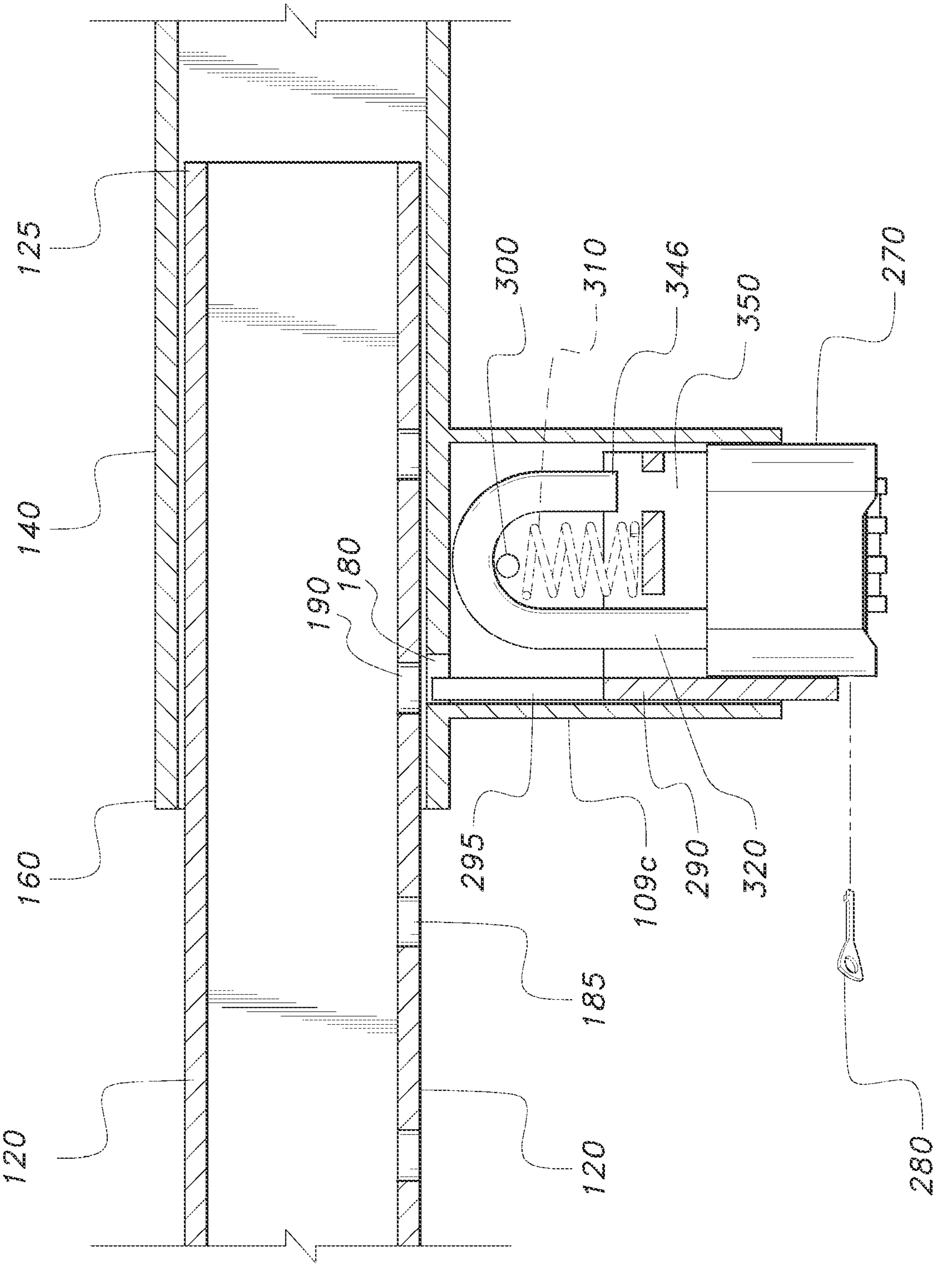
FIG. 21 shows a schematic longitudinal section view of the shaft and first segment of the extendable door lock of FIG. 20 with the lock mechanism in the form of a spring-loaded combination lock in an unlocked configuration according to the invention.
Figure 22A:
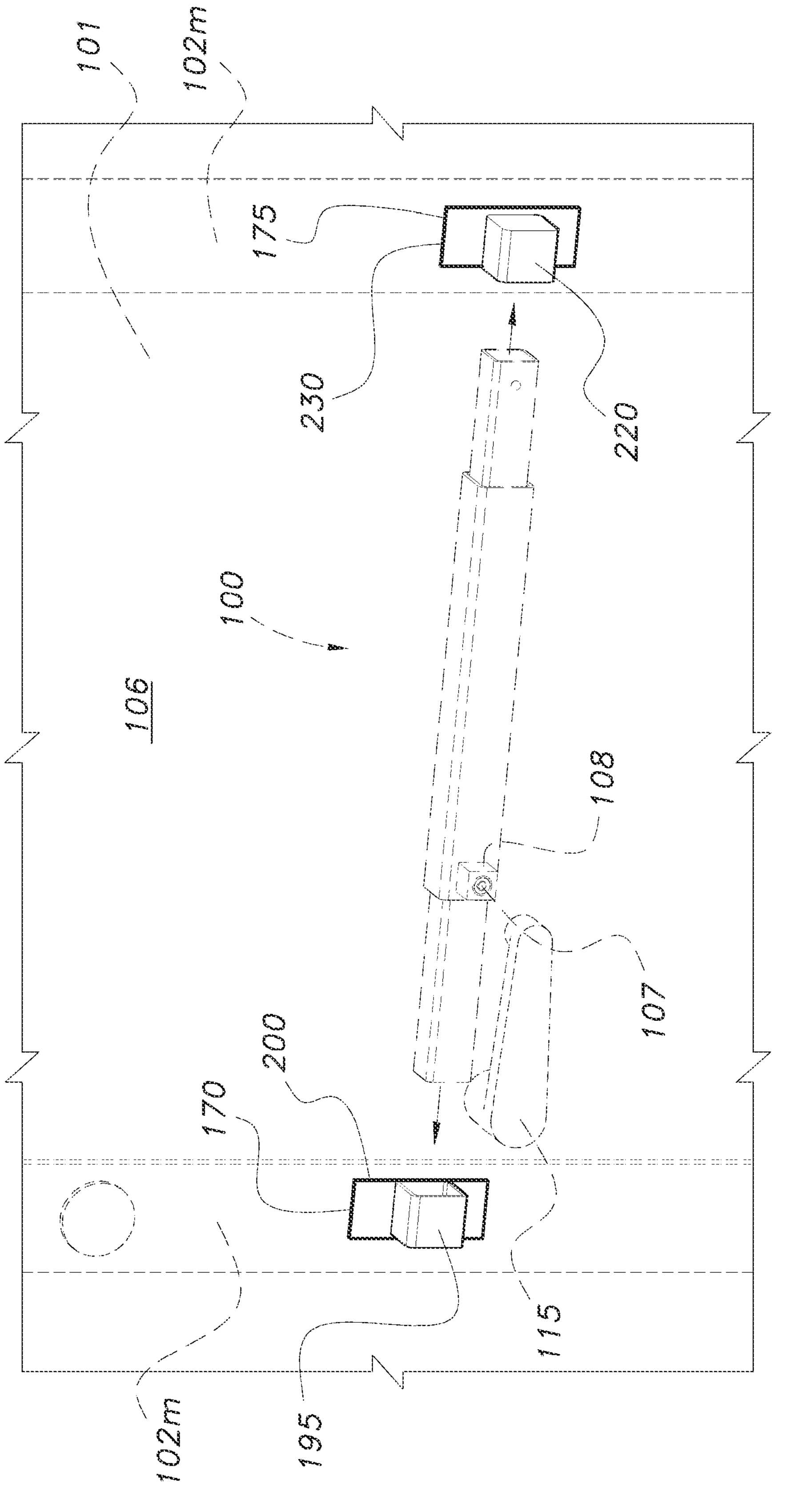
FIGS. 22A through 23B show first and second mounting brackets welded to a metal door jamb.
Figure 22B:
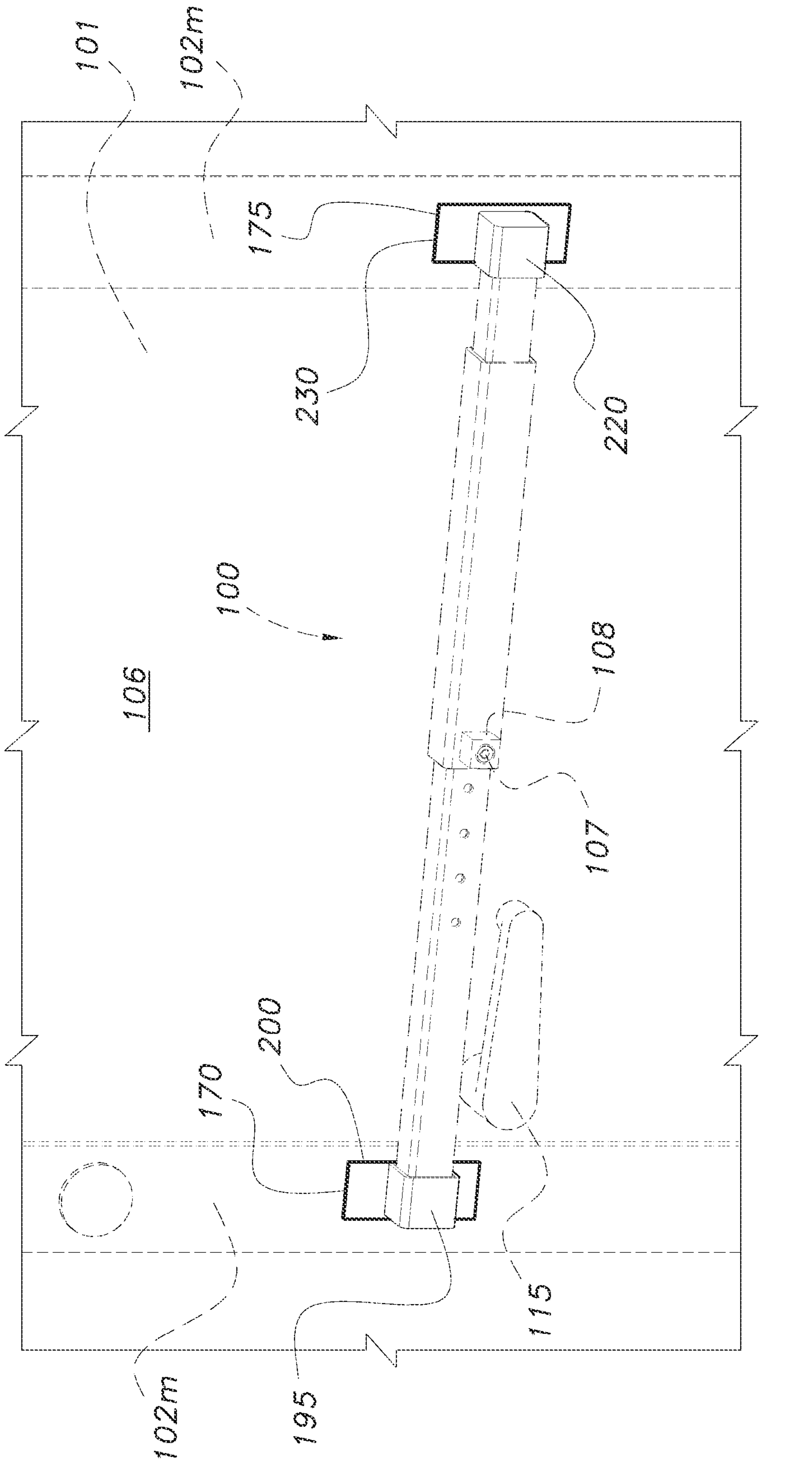

FIG. 21 shows a schematic longitudinal section view of the spring-loaded combination lock 265 with the combination lock 270 in its unlocked configuration. In this configuration the spring 310 is decompressed having pushed the combination lock 270 partly out of housing 109*c*. The combination lock hook 320 is shown in an open state (revealing hook gap 350) following a correct input into the combination lock 270 by the human user. The bracket tongue 295 has withdrawn from the aligned first shaft hole 190 thereby permitting free movement of the first shaft 120 relative to the second shaft 135. A human user (not shown) of the extendable door lock 100 inputs a code into the combination lock 270 to unlock the combination lock 270.

Referring to FIGS. 22A through 23B, the first base plate 200 and second base plate 230 is shown welded onto a metal door jamb 102*m*; the metal door jamb 102*m* being typically made of steel. In this embodiment there is no requirement for the first interior washer plate 176 nor the second interior washer plate 250; in addition there is no requirement for the first plurality of fasteners 215 nor the second plurality of fasteners 245.

Figure 6:
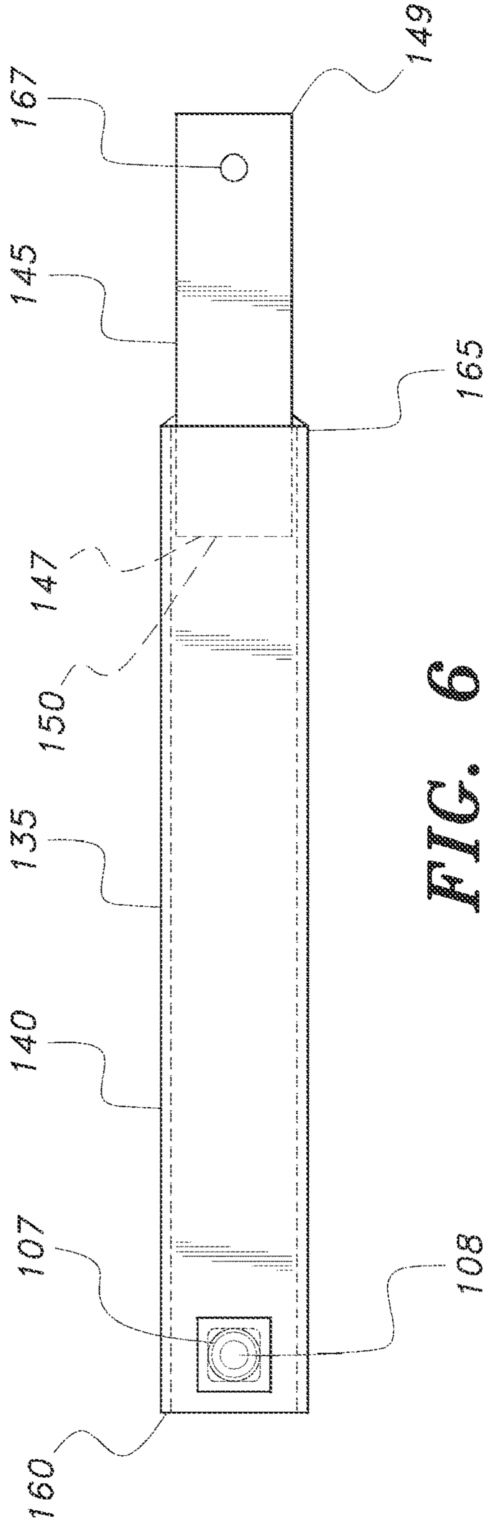
FIG. 6 shows a top planar view of a second shaft showing first and second segments and a lock mechanism according to the invention.
Figure 7:
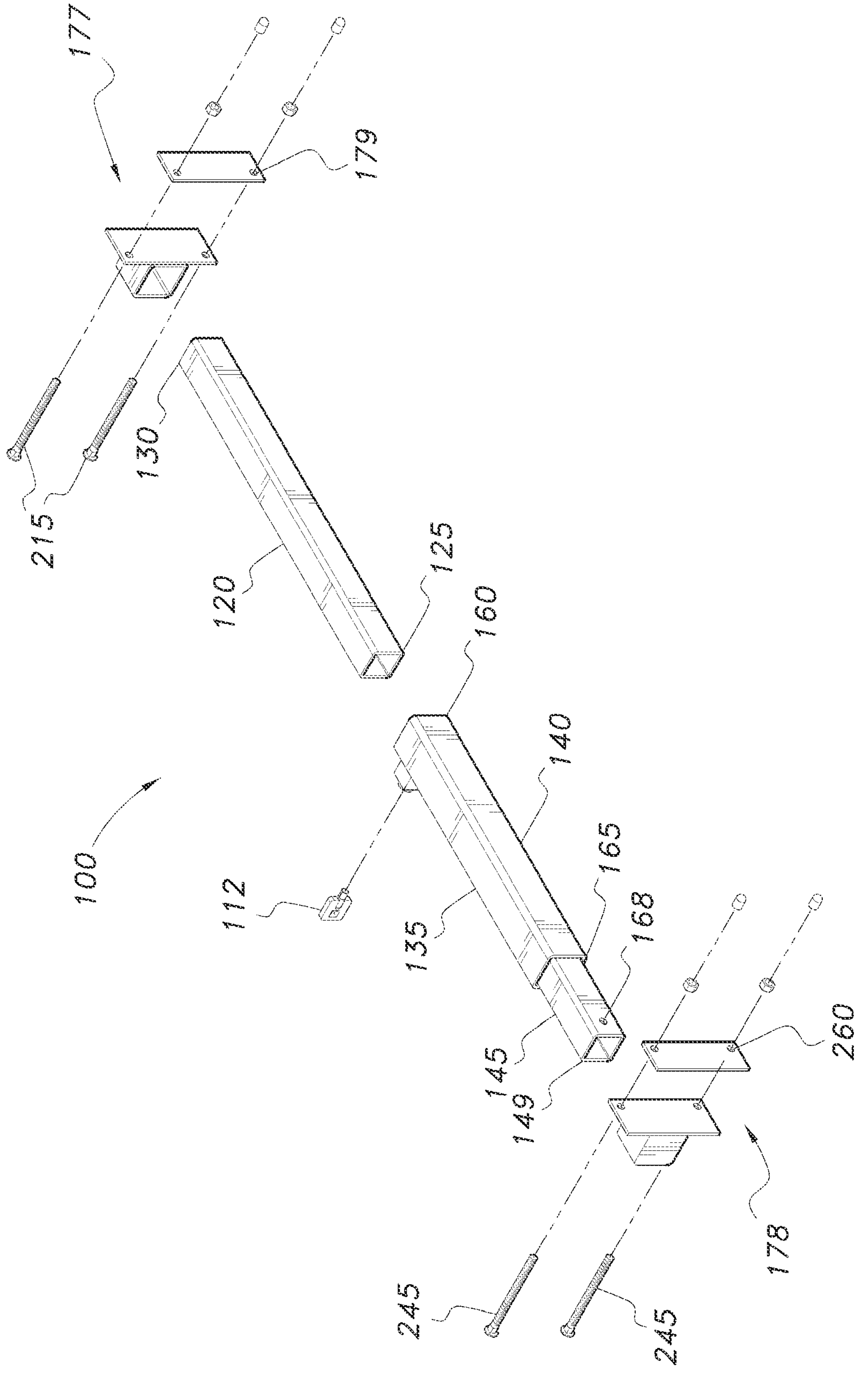
FIG. 7 shows a reverse side perspective view of an extendable door lock according to the invention.
Figure 8:
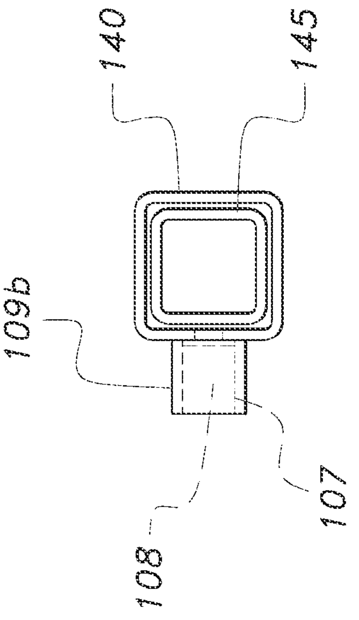
FIG. 8 shows an end view of the second shaft of FIG. 6 according to the invention.

The relatively small triangular shapes observed between the first segment 140 and the second segment 145 shown in FIG. 6 of the drawings signify a weld between the first segment 140 and the second segment 145.

In one non-limiting embodiment, the extendable door lock 100 (and which also applies to the versions of the extendable door lock represented by numerals 100*s* (see FIG. 3B) and 100*c* (see, for example FIG. 16)) is made of steel. In one non-limiting embodiment, the extendable door lock 100 (including 100*s* and 100*c*) is made of composite material. In one non-limiting embodiment, the extendable door lock 100 (including 100*s* and 100*c*) is made of a combination of composite material and steel. For example, the amount of composite can vary between 5% and 95% the remaining being steel. In the alternative, the amount of steel can vary between 5% and 95% the remaining being composite material.

The composite material can take any suitable form such as, but not limited to, fiber-reinforced plastic. Examples of fiber-reinforced plastic products include angles, bars, I-beams, boardwalks, bridges, channels, coverboard, covers, decks, flooring, floats, gates, grates, handrails, ladders, panels, pilings, pipe, poles and walkways.

Patents which explain how to make and/or mould fiber-reinforced plastics include, alone or in combination, as follows: U.S. Pat. No. 4,255,087 (to Wackerle, et al, "Member formed of fiber-reinforced plastic material, such as a rotor blade"), U.S. Pat. No. 4,188,032 (to Yanagiok, "Nickel-plated golf club shaft made of fiber-reinforced plastics"), U.S. Pat. No. 4,339,490 (to Yoshioka, et al, "Fiber reinforced plastic sheet molding compound"), U.S. Pat. No. 4,696,459 (to Woltron, et al, "Plastic leaf spring with at least one spring-eye body or spring-eye section"), U.S. Pat. No. 4,671,842 (to Prochaska, et al, "System for the manufacture of tubular structural parts of a fiber-reinforced plastic"), U.S. Pat. No. 4,234,190 (to Airhart, "Carbon fiber-reinforced plastic arrow"), U.S. Pat. No. 6,797,331 (to Singler, et al, "Process for producing a chemical-resistant protective layer for a rotary body having a base body made from fiber-reinforced plastic"), U.S. Pat. No. 5,665,470 (to Key, et al "Glass fibers and fiber-reinforced plastics"), U.S. Pat. No. 5,601,493 (to Nakazono, et al, "Drive shaft made of fiber reinforced plastics, and method for connecting pipe made of fire-reinforced plastics"), U.S. Pat. No. 5,534,318 (to Andre De La Porte, et al, "Hollow fiber-reinforced plastic body"), U.S. Pat. No. 10,611,057 (to Taketa, et al), U.S. Pat. No. 9,751,239 (to Murai, et al, "Method and device for molding fiber-reinforced plastic member"), U.S. Pat. No. 9,574,081 (to Ishimoto, et al, "Epoxy-resin composition, and film, prepreg and fiber-reinforced plastic using the same"), U.S. Pat. No. 9,168,801 (to Dicke, et al, "Transverse link made of fibre-reinforced plastics material for a wheel suspension of a vehicle"), U.S. Pat. No. 7,083,199 (to Graber, et al, "Chassis part consisting of fiber-reinforced plastics, equipped with an integrated sensor"), U.S. Pat. No. 8,376,426 (to Choi, et al, "Plastic composite bumper beam for vehicle") U.S. Pat. No. 10,773,472 (to Takano, et al, "Method for manufacturing fiber-reinforced plastic molded body"), and U.S. Pat. No. 10,227,464 (to Saji, "Fiber-reinforced plastic shaped product").

Composite materials that can also be used in the present invention include those described in: U.S. Pat. No. 11,220,465 (to Kubo, et al, "Method for producing SiC/SiC composite material"), U.S. Pat. No. 11,208,535 (to Ochi, et al, "Production method for prepreg, and production method for fiber-reinforced composite material"), U.S. Pat. No. 11,203,178 (to Kuroda, "Reinforced substrate for composite material, composite material, and method for manufacturing reinforced substrate for composite material"), U.S. Pat. No. 11,187,09 (to Ochi, et al, "Coating-liquid-impregnated fiber-reinforced fabric, sheet-shaped integrated object, prepreg, prepreg tape, and method for manufacturing fiber-reinforced composite material"), U.S. Pat. No. 11,208,911 (to Sadler, et al, "Turbine shroud ring segments with ceramic matrix composite components"), U.S. Pat. No. 11,198,651 (to Sadler, et al, "Turbine shroud ring segments with ceramic matrix composite components")"); U.S. Pat. No. 11,198,924 (to Chandrasekaran, et al, "Composite materials").

It is to be understood that the present invention is not limited to the embodiments described above, but encompasses any and all embodiments within the scope of the following claims.

What is claimed:

1. An extendable door lock sub-assembly, comprising:

a first shaft defining a proximal end and a distal end;

a second shaft, wherein the second shaft comprises a first segment and a second segment, wherein the first segment and the second segment are permanently affixed to each other such that first and second segments do not move relative to each other, the first segment defining a first opposite end and a second opposite end, the second segment defining a third opposite end and a fourth opposite end, the second segment has a smaller cross-section than the first segment, wherein the third opposite end of the second segment is located flush inside the second opposite end of the first segment thereby defining a constriction in the first segment, wherein the first opposite end of the first segment is sized to receive the proximal end of the first shaft, wherein the first shaft is capable of telescoping into and out of the first segment, wherein the constriction prevents the first shaft entering the second segment, wherein the third opposite end of the second segment abuts the interior surface of the first segment, wherein the constriction prevents the first shaft from axially moving past the second segment;

a lock mechanism located at least partly in a housing; and wherein the first segment is perforated to provide an inner hole, the first shaft is perforated to provide a plurality of first shaft holes, wherein when the inner hole is aligned with one of the plurality of first shaft holes the lock mechanism is capable of engaging the inner hole with the aligned first shaft hole to prevent movement of the first shaft relative to the second shaft.

2. The extendable door lock sub-assembly according to claim 1, wherein the lock mechanism is a spring-loaded combination lock.

3. The extendable door lock sub-assembly according to claim 1, wherein the lock mechanism is a barrel lock.

4. The extendable door lock sub-assembly according to claim 1, wherein the extendable door lock is made of a combination of composite material and steel, wherein the amount of steel can vary between 5% and 95% the remaining being composite material.

5. An extendable door lock, comprising:

a first shaft defining a proximal end and a distal end;

a second shaft, wherein the second shaft comprises a first segment and a second segment, wherein the first segment and the second segment are permanently affixed to each other such that first and second segments do not move relative to each other, the first segment defining a first opposite end and a second opposite end, the second segment defining a third opposite end and a fourth opposite end, the second segment has a smaller cross-section than the first segment, wherein the third opposite end of the second segment is located flush inside the second opposite end of the first segment thereby defining a constriction in the first segment, wherein the first opposite end of the first segment is sized to receive the proximal end of the first shaft, wherein the first shaft is capable of telescoping into and out of the first segment, wherein the constriction prevents the first shaft entering the second segment, wherein the third opposite end of the second segment abuts the interior surface of the first segment, wherein the constriction prevents the first shaft from axially moving past the second segment;

a first mounting bracket means for receiving the distal opposite end of the first shaft;

a second mounting bracket means for receiving the fourth opposite end of the second segment;

a lock mechanism located at least partly in a housing; and wherein the first segment is perforated to provide an inner hole, the first shaft is perforated to provide a plurality of first shaft holes, wherein when the inner hole is aligned with one of the plurality of first shaft holes the lock mechanism is capable of engaging the inner hole with the aligned first shaft hole to prevent movement of the first shaft relative to the second shaft.

6. The extendable door lock according to claim 5, wherein the lock mechanism is a spring-loaded combination lock.

7. The extendable door lock according to claim 5, wherein the lock mechanism is a barrel lock.

8. The extendable door lock according to claim 5, wherein the extendable door lock is made of composite material.

9. The extendable door lock according to claim 5, wherein the extendable door lock is made of steel.

10. The extendable door lock according to claim 5, wherein the extendable door lock is made of a combination of composite material and steel, wherein the amount of composite can vary between 5% and 95% the remaining being steel.

11. The extendable door lock according to claim 5, wherein the extendable door lock is made of a combination of composite material and steel, wherein the amount of steel can vary between 5% and 95% the remaining being composite material.

12. An extendable door lock, comprising:

a first shaft defining a proximal end and a distal end;

a second shaft, wherein the second shaft comprises a first segment and a second segment, wherein the first segment and the second segment are permanently affixed to each other such that first and second segments do not move relative to each other, the first segment defining a first opposite end and a second opposite end, the second segment defining a third opposite end and a fourth opposite end, the second segment has a smaller cross-section than the first segment, wherein the third opposite end of the second segment is located flush inside the second opposite end of the first segment thereby defining a constriction in the first segment, wherein the first opposite end of the first segment is sized to receive the proximal end of the first shaft, wherein the first shaft is capable of telescoping into and out of the first segment, wherein the constriction prevents the first shaft entering the second segment, wherein the third opposite end of the second segment abuts the interior surface of the first segment, wherein the constriction prevents the first shaft from axially moving past the second segment;

a first mounting bracket, wherein the first mounting bracket comprises a first tubular component for receiving the distal opposite end of the first shaft, the first tubular component being capped off, wherein the first tubular component is attached to a first base plate, the first base plate having a first surface, the first base plate having a plurality of first base plate holes there-through, wherein the first mounting bracket further comprises a first plurality of fasteners;

a second mounting bracket, wherein the second mounting bracket comprises a second tubular component for receiving the fourth opposite end of the second segment, the second tubular component being capped off, wherein the second tubular component is attached to a second base plate, the second base plate having a second surface, the second base plate having a plurality of second base plate holes there-through, wherein the second mounting bracket further comprises a second plurality of fasteners;

a lock mechanism located at least partly in a housing; and wherein the first segment is perforated to provide an inner hole, the first shaft is perforated to provide a plurality of first shaft holes, wherein when the inner hole is aligned with one of the plurality of first shaft holes the lock mechanism is capable of engaging the inner hole with the aligned first shaft hole to prevent movement of the first shaft relative to the second shaft.

13. The extendable door lock according to claim 12, further comprising:

a first washer plate in contact with the first surface, the first washer plate having a plurality of first washer plate holes aligned with the plurality of first base plate holes, wherein the aligned plurality of first washer plate holes and plurality of first base plate holes together accommodate the first plurality of fasteners there-through, and a second washer plate in contact with the second surface, the second washer plate having a plurality of second washer plate holes aligned with the plurality of second base plate holes, wherein the aligned plurality of second washer plate holes and plurality of second base plate holes together accommodate the second plurality of fasteners there-through.

14. The extendable door lock according to claim 12, wherein the first shaft, and the second shaft, are capable of being orientated such that the lock mechanism adopts any one of three orientations, a first orientation wherein the lock mechanism points downward in the vertical plane, a second orientation wherein the lock mechanism points upward in the vertical plane, and a third orientation wherein the lock mechanism points outward in the horizontal plane.

15. The extendable door lock according to claim 12, wherein the lock mechanism is a spring-loaded combination lock.

16. The extendable door lock according to claim 12, wherein the lock mechanism is a barrel lock.

17. The extendable door lock according to claim 12, wherein the extendable door lock is made of composite material.

18. The extendable door lock according to claim 12, wherein the extendable door lock is made of steel.

19. The extendable door lock according to claim 12, wherein the extendable door lock is made of a combination of composite material and steel, wherein the amount of composite material can vary between 5% and 95% the remaining being steel.

20. The extendable door lock according to claim 12, wherein the extendable door lock is made of a combination of composite material and steel, wherein the amount of steel can vary between 5% and 95% the remaining being composite material.

* * * * *